United States Patent
Gaben

(10) Patent No.: US 10,454,092 B2
(45) Date of Patent: Oct. 22, 2019

(54) METHOD FOR MANUFACTURING ALL-SOLID-STATE BATTERIES IN A MULTILAYER STRUCTURE

(71) Applicant: I-TEN, Champagne-au-Mont-d'Or (FR)

(72) Inventor: Fabien Gaben, Ecully (FR)

(73) Assignee: I-TEN, Champagne-au-Mont-d'Or (FR)

( * ) Notice: Subject to any disclaimer, the term of this patent is extended or adjusted under 35 U.S.C. 154(b) by 0 days.

(21) Appl. No.: 14/758,229

(22) PCT Filed: Dec. 31, 2013

(86) PCT No.: PCT/FR2013/053289
§ 371 (c)(1),
(2) Date: Jun. 27, 2015

(87) PCT Pub. No.: WO2014/102520
PCT Pub. Date: Jul. 3, 2014

(65) Prior Publication Data
US 2015/0333376 A1     Nov. 19, 2015

(30) Foreign Application Priority Data
Dec. 31, 2012   (FR) ..................... 12 62967

(51) Int. Cl.
*H01M 4/04*     (2006.01)
*H01M 2/04*     (2006.01)
(Continued)

(52) U.S. Cl.
CPC .......... *H01M 4/0457* (2013.01); *C25D 13/02* (2013.01); *H01M 2/0404* (2013.01);
(Continued)

(58) Field of Classification Search
CPC .......... H01M 10/0436; H01M 10/052; H01M 10/0525; H01M 10/0562; H01M 10/0585;
(Continued)

(56) References Cited

U.S. PATENT DOCUMENTS 5,561,004 A * 10/1996 Bates ................. H01M 2/0275
                                                      429/162
7,285,334 B1 * 10/2007 Yamashita .......... H01M 2/0267
                                                      428/220

(Continued)

FOREIGN PATENT DOCUMENTS

EP           2037527 A1      3/2009
JP        2002042790 A   *  2/2002
(Continued)

*Primary Examiner* — Carlos Barcena
(74) *Attorney, Agent, or Firm* — Jordan IP Law, LLC; Todd A. Vaughn

(57) ABSTRACT

A method for producing an all-solid multilayer battery, and an all-solid multilayer battery. The all-solid multilayer battery may be produced by depositing, by electrophoresis without any binder, at least one anode layer, at least one electrolyte layer, and at least one cathode layer. The at least one electrolyte layer, and the at least one cathode layer are obtained from a colloidal suspension containing nanoparticles that are not agglomerated with each other to create clusters and remain isolated from each other. A layer of Ms bonding material is then deposited on a surface of the at least one electrolyte layer. Next, two layers from the at least one dense anode layer, the at least one dense electrolyte layer, and the at least one dense cathode layer, are stacked face-to-face to obtain the all-solid multilayer battery having an assembly of a plurality of elementary cells connected with one another in parallel.

19 Claims, 9 Drawing Sheets

(51) Int. Cl.
  *H01M 10/0585* (2010.01)
  *H01M 10/0525* (2010.01)
  *H01M 10/04* (2006.01)
  *H01M 10/0562* (2010.01)
  *C25D 13/02* (2006.01)
  *H01M 4/139* (2010.01)
  *H01M 10/052* (2010.01)

(52) U.S. Cl.
  CPC ....... *H01M 4/139* (2013.01); *H01M 10/0436* (2013.01); *H01M 10/052* (2013.01); *H01M 10/0525* (2013.01); *H01M 10/0562* (2013.01); *H01M 10/0585* (2013.01); *H01M 2220/30* (2013.01); *Y10T 29/49117* (2015.01)

(58) Field of Classification Search
  CPC ........... H01M 2220/30; H01M 2/0404; H01M 4/0457; H01M 4/139; C25D 13/02
  See application file for complete search history.

(56) References Cited

U.S. PATENT DOCUMENTS

| | | | |
|---|---|---|---|
| 2004/0157121 A1* | 8/2004 | Watanabe | H01M 2/0426 429/185 |
| 2007/0184345 A1 | 8/2007 | Neudecker | |
| 2010/0216032 A1 | 8/2010 | Baba | |
| 2011/0171528 A1* | 7/2011 | Oladeji | C23C 18/06 429/223 |
| 2013/0244102 A1* | 9/2013 | Golodnitsky | H01M 2/0202 429/210 |

FOREIGN PATENT DOCUMENTS

| | | |
|---|---|---|
| JP | 2002042792 A * | 2/2002 |
| JP | 2007123192 A * | 5/2007 |
| WO | 2012076950 A1 | 6/2012 |

\* cited by examiner

METHOD FOR MANUFACTURING ALL-SOLID-STATE BATTERIES IN A MULTILAYER STRUCTURE

CROSS-REFERENCE TO RELATED APPLICATIONS

The present application is a National Stage Application of PCT International Application No. PCT/FR2013/053289 (filed on Dec. 31, 2013), under 35 U.S.C. § 371, which claims priority to French Patent Application No. A 1262967 (filed on Dec. 31, 2012), which are each hereby incorporated by reference in their respective entireties.

FIELD OF THE INVENTION

This invention relates to the field of batteries, and in particular, lithium ion batteries. It relates more specifically to all-solid-state lithium ion batteries, and a novel method for manufacturing such batteries.

BACKGROUND

The modes for manufacturing lithium ion batteries ("Li-ion batteries") are presented in many articles and patents, and the work "Advances in Lithium-Ion Batteries" (ed. W. van Schalkwijk and B. Scrosati), published in 2002 (Kluever Academic/Plenum Publishers) provides a good assessment of them. The electrodes of Li-ion batteries can be produced by means of printing techniques (in particular: roll coating, doctor blade, tape casting). These techniques make it possible to produce deposits having a thickness of between 50 and 400 µm. Depending on the thickness of the deposits, their porosities and the size of the active particles, the power and energy of the battery may be modulated. The inks (or pastes) deposited in order to form the electrodes contain particles of active materials, but also binders (organic), carbon powder making it possible to ensure the electrical contact between the particles, and solvents that are evaporated in the electrode drying step. To improve the quality of electrical contacts between the particles and compact the deposits, a calendering step is performed on the electrodes, after which the active particles of the electrodes occupy around 60% of the volume of the deposit, which means that there is generally 40% porosity between the particles. These porosities are then filled with a liquid or gelled electrolyte, capable of comprising solid ion and/or electrical conducting particles.

Other lithium-ion battery architectures have however been developed for electrical energy micro-storage applications. These are thin-film micro-batteries. To satisfy the requirements of miniaturization and temperature stability, these micro-batteries are all-solid, without binders or lithium salt-based electrolytes and equipped with very thin electrodes, on the order of 2 to 5 microns. Such thin-film battery cells have excellent mass and volume energy densities. Indeed, their electrodes are all-solid, without porosities and therefore totally compact. The electrolyte layers deposited on the electrodes consist of highly insulating ceramic or glass-ceramic materials, capable of being deposited in very fine thicknesses without producing risks of short-circuits or excessive self-discharge.

This battery cell architecture, without binders or lithium salt-based electrolytes, which is all-solid and without porosity, makes it possible to maximize the amount of active material per unit of volume, represented by an increase in mass and volume energy densities.

To prevent said cells from being too resistive, the electrodes must remain thin, and their thickness is preferably below 5 microns, or the electrodes must include conductive phases of lithium ions and/or electrons co-deposited with the active material phases. To produce these thin-film electrodes, a number of techniques have been described.

The chemical vapor deposition technique is commonly used to produce thin layers in the field of electronics. This technique, and all of its variants, make it possible to obtain high-quality electrode thin films without porosities. Similarly, physical deposition techniques may be used.

"Thermal spray technology" techniques are more suitable for the production of relatively thick deposits, whereas physical deposition techniques are more suitable for the production of thin films, with thickness below 5 microns. Physical deposition techniques include a number of variants according to the spraying modes. The vaporization of compounds to be deposited can be performed by radiofrequency (RF) excitation, or ion beam assisted deposition (IBAD). Physical deposition techniques make it possible to obtain very high quality deposits containing almost no occasional defects, and make it possible to produce deposits at relatively low temperatures. The other technologies currently available for producing thin films include embodiments based on densification of particle deposits. Among these techniques, sol-gel deposition may be cited. This technique consists in depositing a polymer network on the surface of a substrate, which polymer network is obtained after steps of hydrolysis, polymerization and condensation. The sol-gel transition appears during evaporation of the solvent, which accelerates the reaction processes at the surface. This technique makes it possible to produce compact very thin deposits. Another technique capable of being implemented in order to produce all-solid thin-film deposits consists in depositing material powders forming the electrode in the form of a green ceramic sheet and densifying said deposit by means of a suitable thermomechanical treatment.

These all-solid thin-film battery architectures have numerous advantages over "conventional" Li-ion batteries. The risks of internal short-circuit and thermal runaway are almost eliminated due to the fact that the electrolyte layer no longer contains combustible organic elements, or porosities in which metal salts would be capable of precipitating (more specifically the lithium ions contained in the liquid electrolytes).

Aside from the risk of short-circuit, the performances of conventional batteries, containing aprotic electrolytes with lithium salts, are highly temperature-dependent, so that their use under extreme conditions becomes very difficult if not impossible.

In fact, these batteries have thick electrodes, and the electrolytes impregnated in the porosities of the electrodes help to accelerate the transport of the lithium ions in the thickness of the electrodes, the diffusion of the lithium ions in the solid phases (active particles) being much slower than the transport of lithium ions in the liquid electrolyte.

However, the kinetics of the transport of lithium ions in the electrolytes and the stability thereof is temperature-dependent. An excessively low operating temperature may lead to precipitation of lithium salts in the electrolyte and to an excessive increase in the internal resistance of the battery due to the reduction in ion conduction properties.

For very high temperatures, the organic materials break down rapidly, the organic solvents are capable of evaporating, the passivation layers on the electrolytes may also dissolve in an exothermal method. All of these phenomena lead to the irreversible deterioration of the battery which may lead to cell combustion.

Although they have numerous disadvantages, electrolytes in the form of aprotic liquids containing lithium salts make it possible to assemble stacks of battery cells in order to produce high-capacity batteries. In fact, these liquid electrolytes serve to produce, very simply, an ionic contact of the battery electrodes in order to produce electrochemical cells.

The porous electrodes of the batteries are then arranged in a stack or spiral and the anodes and cathodes are separated by a porous separator. The electrical connections are then produced by connecting the anode collectors with one another and the cathode collectors with one another. The ionic conduction between the anodes and cathodes is then ensured by impregnation of the liquid electrolyte in the porosities of the battery cell (i.e. in the porosities of the electrodes and the separator located between the electrodes).

When all-solid porosity-free electrodes (and/or electrolytes) are used, this contact becomes almost impossible to produce because the mechanical contacts between two solids are not "intimate" enough by comparison with a liquid/solid contact in order to ensure a good transfer of ions at said interface.

In addition, thin-film batteries currently consist of an elementary cell, consequently having a planar structure. They consist of a single cathode/electrolyte/anode stack produced by successive deposition of each of said layers, and cannot be assembled in order to produce an all-solid multilayer cell in the form of a one-piece component.

Only parallel electrical connections of a plurality of independent cells may be produced.

SUMMARY

This invention relates to a method for producing all-solid batteries, said batteries including at least one layer containing anode materials ("anode layer"), at least one layer containing solid electrolyte materials ("electrolyte layer"), and at least one layer containing cathode materials ("cathode layer"), each of said three layers being deposited by electrophoresis in order to obtain an all-solid multilayer battery consisting of an assembly of a plurality of elementary cells connected with one another in parallel, said method being characterized in that, before the face-to-face stacking of said layers obtained by electrophoresis, a layer of Ms bonding material is deposited on the face of at least one of said two layers obtained by electrophoresis, which will be stacked face-to-face; said layers on which said Ms bonding material is deposited are dense layers.

The Ms bonding material layer must be a good lithium ion conductor. The melting point of the Ms bonding material layer as deposited must be lower than that of the layers with which it is in contact. The Ms bonding material may be the same as the material of at least one layer with which it is in contact, or it may be different. If it is the same, and advantageously in any case, the Ms bonding material layer preferably includes nanometer-sized particles.

This method more specifically includes the following successive steps: (a) an anode layer and a cathode layer are each deposited on their respective conductive substrates, preferably a metal sheet or strip or a metallized insulating sheet or strip or film, said conductive substrates, or the conductive elements thereof, being capable of serving as an anode and cathode current collector, respectively; (b) a solid electrolyte layer is deposited on at least one of the two layers obtained in step (a); (c) an Ms bonding material layer is deposited on at least one of the layers obtained in step (a) and/or (b); and d) the layer obtained in step c) is stacked face-to-face with a layer obtained in step (a), (b) or (c) in order to obtain a stack, and a thermal treatment and/or mechanical compression promoting contact between said two layers stacked face-to-face is performed in order to obtain an all-solid and one-piece multilayer assembly of elementary cells, capable of operating as a battery.

Preferably, the deposition of the anode and cathode layer is performed on the two faces of their respective conductive substrates.

The deposition of the Ms bonding material layer may be performed by one of the following techniques: (i.) vacuum deposition technique, and more specifically physical vapor deposition, chemical vapor deposition, or plasma-enhanced chemical vapor deposition; (ii.) sol-gel deposition technique; (iii.) suspended nanoparticle deposition technique, more specifically inking, dipping, centrifugation (spin-coating), and Langmuir-Blodgett techniques; (iv.) electrospraying technique; (v.) aerosol deposition technique; or (vi.) electrophoresis deposition technique.

According to a specific embodiment, the layers deposited by electrophoresis obtained in step (a), (b) and (c) may be densified before step (d) by a thermal treatment and/or by mechanical compression when said layers are not capable of being dense and compact directly after deposition.

Advantageously, when a solid electrolyte layer is deposited on at least one of the two layers obtained in step (a), the thickness of the Ms bonding material layer obtained in step (c) is below 100 nm, preferably below 50 nm and even more preferably below 30 nm.

In a preferred embodiment, the mechanical compression of the stack of step d) is performed at a pressure of between 10 and 100 MPa, preferably between 20 and 50 MPa. Similarly, the thermal treatment of step d) is performed advantageously at a temperature TR that, preferably, does not exceed 0.7 times the melting or decomposition temperature (expressed in ° C.) and, more preferably, does not exceed 0.5 times and even more preferably does not exceed 0.3 times) the melting or decomposition temperature (expressed in ° C.) of the at least one most fusible Ms bonding material subjected to said thermal densification step.

The Ms bonding material is chosen from one or more of the following materials: (a) oxide-based materials chosen from $Li_{3.6}Ge_{0.6}V_{0.4}O_4$; $Li_2O$-$Nb_2O_5$; $LiSiO_4$; $Li_2O$; $Li_{14}Zn(GeO_4)_4$; $Li_{0.35}La_{0.55}TiO_3$; $Li_{0.5}La_{0.5}TiO_3$; $Li_7La_3Zr_2O_{12}$; $Li_5+xLa_3(Zr_xA2-x)O_{12}$ with A=Sc, Ti, V, Y, Nb, Hf, Ta, Al, Si, Ga, Ge, Sn and $1.4 \leq x \leq 2$; (b) nitride- or oxynitride-based materials chosen from $Li_3N$; $Li_3PO_4$-$xN_{2x/3}$, $Li_4SiO_4$-$xN_{2x/3}$, $Li_4GeO_4$-$xN_{2x/3}$ with $0<x<4$ or $Li_3BO_{3-x}N_{2x/3}$ with $0<x<3$; oxynitride-based materials of lithium and phosphorus (called LiPON) that may possibly contain silicon (called LiSiPON), boron (called LiPONB), sulfur (called LiPONS) or aluminum (called LiPAON) or a combination of aluminum, boron, sulfur and/or silicon; the lithium and boron oxynitride-based materials (called LiBON) that may possiblycontain silicon (called LiSiBON), sulfur (called (LiBONS) or aluminum (called LiBAON) or a combination of aluminum, sulfur and silicon; and more specifically materials of the $Li_xPO_yN_z$ type with $x\sim2.8$ and $2y=3z$ with $0.16 \leq z \leq 0.46$; or $Li_wPO_xN_yS_z$ with $(2x+3y+2z)=(5+w)$ and $3.2 \leq x \leq 3.8$; $0.13 \leq y \leq 0.4$; $0 \leq z \leq 0.2$; $2.9 \leq w \leq 3.3$; or $LitP_xAl_yO_uN_vS_w$ with $(5x+3y)=5$; $(2u+3v+2w)=(5+t)$; $2.9 \leq t \leq 3.3$; $0.84 \leq x \leq 0.94$; $0.094 \leq y \leq 0.26$; $3.2 \leq u \leq 3.8$; $0.13 \leq v \leq 0.46$; $0 \leq w \leq 0.2$; or $Li_{1.9}Si_{0.2}P_{1.0}O_{1.1}N_{1.0}$; or $Li_{2.9}PO_{3.3}N_{0.46}$; (c) sulfide-based materials chosen from: $Li_xM_{1-y}M'_yS_4$ with M=Si, Ge, Sn and M'=P, Al, Zn, Ga, Sb; $Li_2S$; $B_2S_3$; $P_2S_5$;

$70Li_2S-30P_2S_5$; $Li_7P_3S_{11}$; $Li_{10}GeP_2S_{12}$; $Li_7PS_6$; $Li_{3.25}Ge_{0.25}P_{0.75}S_4$; $Li_{10}MP_2S_{12}$ with M=Si, Ge, Sn and mixtures between $Li_2S$ and one of the compounds among $P_2S_5$, $GeS_2$, $Ga_2S_3$ or $SiS_2$; (d) phosphate or borate-based materials chosen from $Li_3PO_4$; $LiTi(PO_4)_3$; $Li_{1+x}Al_xM_{2-x}(PO_4)_3$ (or M=Ge, Ti, and/or Hf and in which 0<x≤1); $Li_{1.3}Al_{0.3}Ti_{1.7}(PO_4)_3$; $Li_{1+x+y}Al_xTi_{2-x}Si_yP_{3-y}O_{12}$ (in which 0≤x≤1 and 0≤y≤1); $Li_{1+x+z}M_x(Ge_{1-y}Ti_y)_{2-x}Si_zP_{3-z}O_{12}$ (in which 0≤x≤0.8, 0≤y≤1.0, 0≤z≤0.6); $2(Li_{1.4}Ti_2Si_{0.4}P_{2.6}O_{12})$—$AlPO_4$; $Li_xAl_{z-y}Ga_yS_w(PO_4)_c$ or $Li_xAl_{z-y}Ga_yS_w(BO_3)_c$ or $Li_xGe_{z-y}Si_yS_w(PO_4)_c$ or $Li_xGe_{z-y}S_yS_w(BO_3)_c$ or more generally $LiAl_{z-y}M'_yS_w(PO_4)_c$ or $Li_xM_{z-y}M'_yS_w(BO_3)_c$ with 4<w<20, 3<x<10, 0≤y≤1, 1≤z≤4 and 0<c<20 and M or M' an element among Al, Si, Ge, Ga, P, Zn, Sb; (e) mixed materials chosen from the mixtures between $Li_2S$ and one of the compounds among $Li_3PO_4$, $Li_3PO_{4-x}N_{2x/3}$, $Li_4SiO_{4-x}N_{2x/3}$, $Li_4GeO_{4-x}N_{2x/3}$ with 0<x<4 or $Li_3BO_{3-x}N_{2x/3}$ with 0<x<3; the mixtures between $Li_2S$ and/or $B_2S_3SiS_2$, $P_2S_5$, $GeS_2$, $Ga_2S_3$ and a compound of the $Li_aMO_b$ type, which may be a lithium silicate $Li_4SiO_4$, a lithium borate $Li_3BO_3$ or a lithium phosphate $Li_3PO_4$.

In general, the sizes D50 of the Ms bonding material particles are preferably below 100 nm, preferably below 50 nm and even more preferably below 30 nm.

Advantageously, the Ms bonding material comprises at least one (or consists of at least one) polymer impregnated with a lithium salt, the polymer preferably being chosen from the group formed by polyethylene oxide, polyimides, vinylidene polyfluoride, polyacrylonitrile, polymethyl methacrylate, polysiloxanes, and lithium salt preferably being chosen from LiCl, LiBr, LiI, $Li(ClO_4)$, $Li(BF_4)$, $Li(PF_6)$, $Li(AsF_6)$, $Li(CH_3CO_2)$, $Li(CF_3SO_3)$, $Li(CF_3SO_2)2N$, $Li(CF_3SO_2)_3$, $Li(CF_3CO_2)$, $Li(B(C_6H_5)_4)$, $Li(SCN)$, $Li(NO_3)$.

The invention also relates to a method for producing all-solid batteries, said batteries including at least one layer containing anode materials ("anode layer"), at least one layer containing solid electrolyte materials ("electrolyte layer"), and at least one layer containing cathode materials ("cathode layer"), each of said three layers being deposited by electrophoresis, said method including the following successive steps: (a) in an arbitrary order, an anode layer and a cathode layer are each deposited on their respective conductive substrates, preferably a metal sheet or strip or a metallized insulating sheet or strip or film, said conductive substrates, or the conductive elements thereof, being capable of serving as an anode and cathode current collector, respectively; (b) a solid electrolyte layer, from a suspension of electrolyte material particles, is deposited on said anode layer and/or said cathode layer obtained in step a); (c) an Ms bonding material layer is deposited on: (i.) the face of the anode or cathode layer obtained in step (a), or (ii.) the face of the anode and/or cathode layer covered with an electrolyte layer obtained in step (b), or (iii.) the face of the anode layer covered with an electrolyte layer obtained in step b) and on the face of the cathode layer obtained in step a); or on the face of the anode layer obtained in step (a) and on the face of the cathode layer covered with an electrolyte layer obtained in step (b); (d) the layer obtained in step (c) is stacked face-to-face with a layer obtained in step (a), (b) or (c) in order to obtain a stack, and a thermal treatment and/or mechanical compression promoting contact between said two layers stacked face-to-face is performed in order to obtain a stacked multilayer structural assembly capable of operating as a battery.

The invention also relates to an all-solid battery capable of being produced by the method according to the invention.

More specifically, the battery consists of an assembly of a plurality of elementary cells connected with one another in parallel.

Advantageously, the conductive substrates of the anode current and cathode current are metal sheets, optionally covered with a noble metal, or polymer sheets, optionally covered with a noble metal, or graphite sheets, optionally covered with a noble metal. More specifically, the conductive substrates of the anode current and cathode current in the form of metal sheets are aluminum or copper. More specifically, the conductive substrates of the anode current and cathode current in the form of polymer sheets are selected from the following polymers: polyethylene naphthalate (PEN), polyethylene terephthalate (PET), polypropylene (PP), Teflon® (PTFE), polyimide (PI) and more specifically Kapton®.

Advantageously, the noble metal is selected from the following metals: gold, platinum, palladium, vanadium, cobalt, nickel, manganese, niobium, tantalum, chromium, molybdenum, titanium, palladium, zirconium, tungsten or any alloy including at least one of these metals.

In one embodiment of the battery according to the invention, said battery includes at least one encapsulation layer, preferably a ceramic or glass-ceramic layer. Advantageously, said battery includes a second encapsulation layer deposited on said first encapsulation layer, said second layer preferably being made of silicone polymer.

Advantageously, the battery includes terminals where the cathode and anode current collectors are visible. Preferably, the anode connections and cathode connections are located on the opposite sides of the stack. Advantageously, the terminals are also covered with a nickel layer in contact with electrochemical cells, said nickel layer being covered with a tin layer.

Preferably, said at least one encapsulation layer covers four of the six faces of said battery, the two other battery faces being covered with terminals.

DRAWINGS

FIGS. 1(a) through 1(f) show products capable of being obtained according to a plurality of embodiments according to the invention.

Figure 5A:
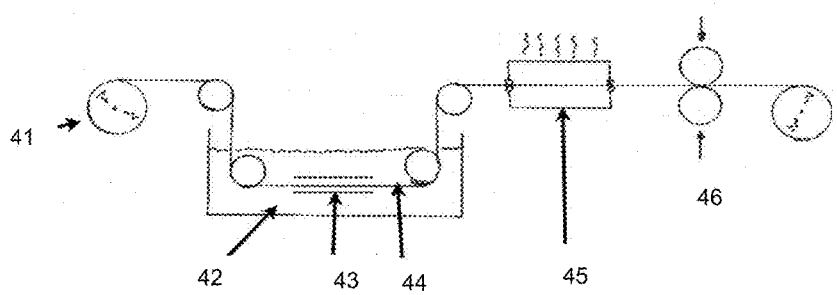
Figure 5B:
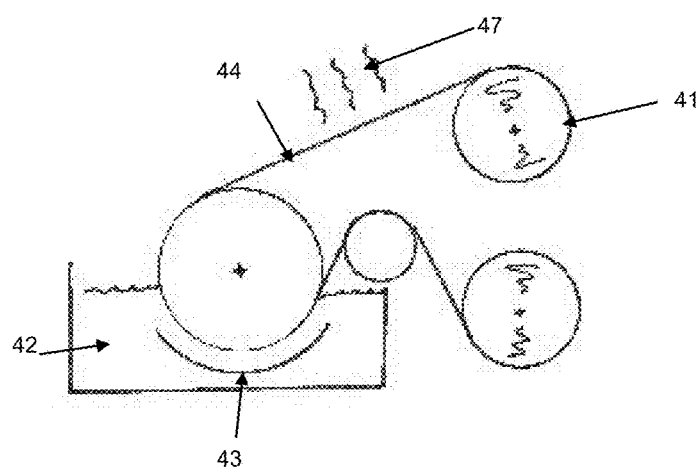

FIGS. 5a and 5b schematically show devices for implementing the method according to the invention.

Figure 6:
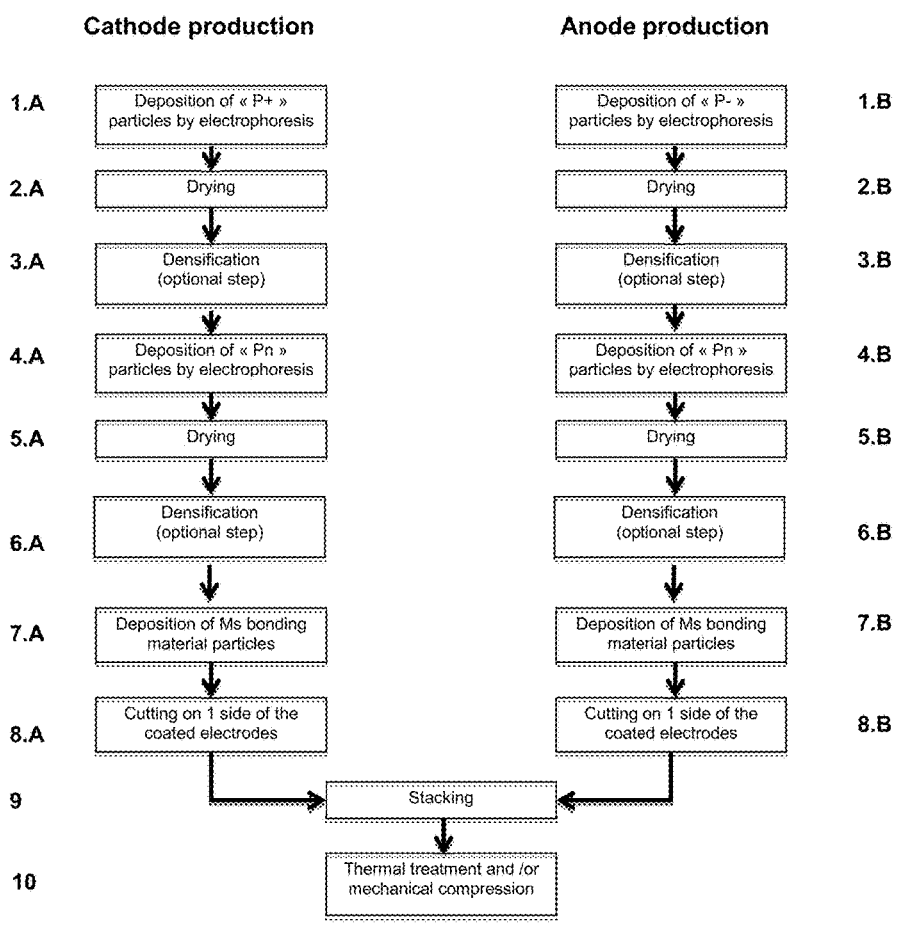

FIG. 6 schematically shows the steps for producing a battery according to an embodiment of the invention.

Figure 7:
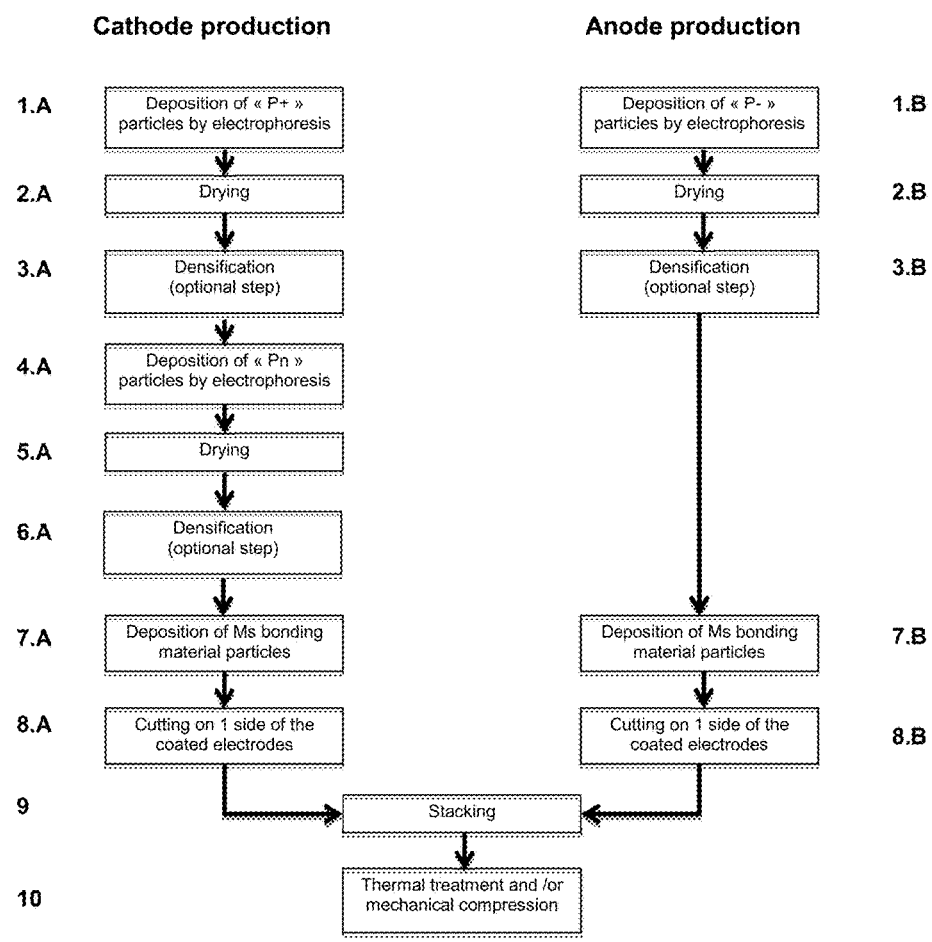
Figure 8:
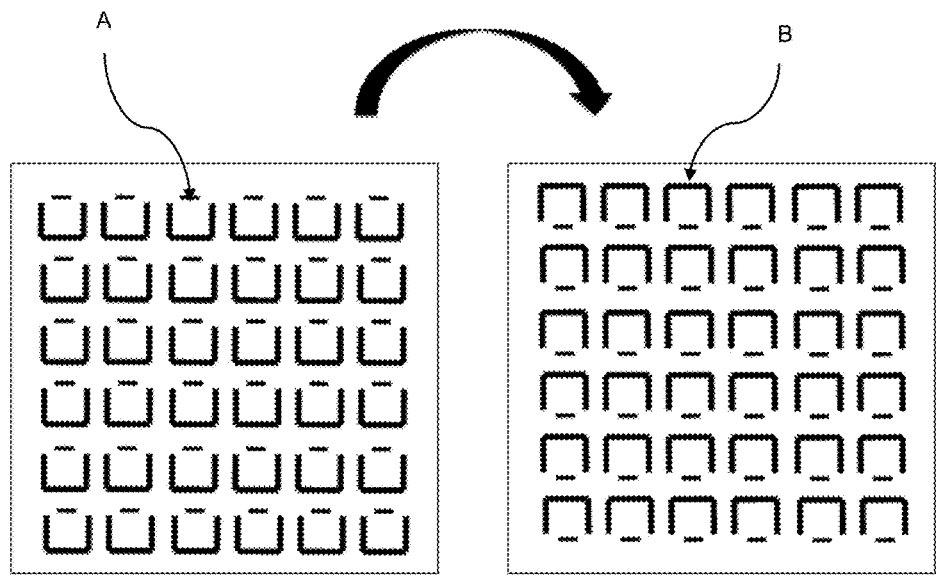

FIG. 7 schematically shows the steps for producing a battery according to an embodiment of the invention FIG. 8 schematically shows a cathode film (left-hand side of the Figure) and an anode film covered with an electrolyte layer (right-hand side of the Figure), the two films including patterns cut out by punching. The black arrow shows the operation of alternate stacking of cathode and anode sheets covered with electrolyte, with their cutout patterns stacked in a head-to-tail configuration.

Figure 9:
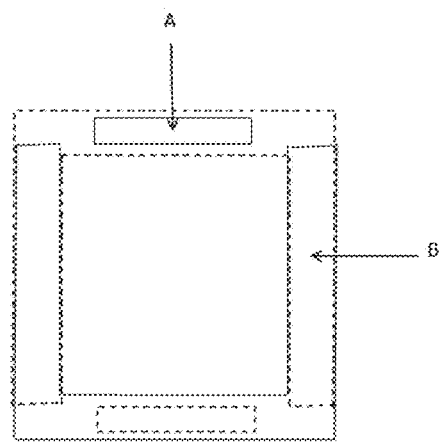

FIG. 9 schematically shows a detail of the stacking of the cathode and anode sheets covered with an electrolyte layer resulting from the stacking shown in FIG. 8.

Figure 10:
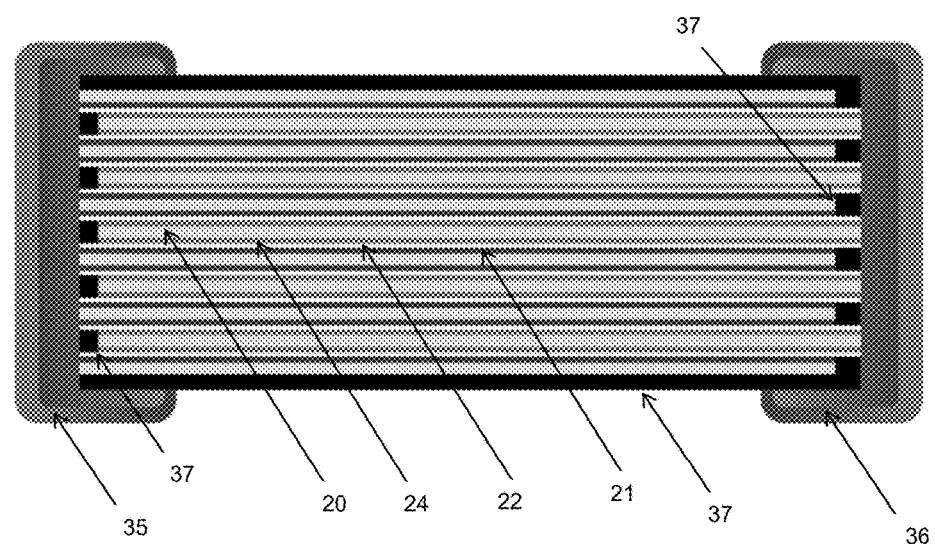

FIG. 10 shows a multilayer battery capable of being obtained by the method according to the invention, according to a particular embodiment.

DESCRIPTION

In the context of this invention, "electrophoretic deposition" or "deposition by electrophoresis" refers to a layer deposited by a method of depositing particles first suspended in a liquid medium, on a preferably conductive substrate, the movement of the particles toward the surface of the substrate being generated by applying an electric field between two electrodes placed in the suspension, one of the electrodes forming the conductive substrate on which the deposition is performed, the other electrode ("counter-electrode") being placed in the liquid phase. A so-called "dense" deposition of particles forms on the substrate, if the zeta potential of the particle suspension has an appropriate value as will be explained below, and/or after a specific thermal and/or mechanical densification treatment, as will be explained below. This deposit has a particular structure recognizable to a person skilled in the art who can distinguish it from deposits obtained by any other technique.

In the context of this document, the size of a particle is its largest dimension. Thus, a "nanoparticle" is a particle in which at least one of the dimensions is smaller than 100 nm. The "particle size" or "average particle size" of a powder or a group of particles is given as D50.

The "zeta potential" of a suspension is defined as being the difference in potential between the interior of the solution and the shear plane of the particle. It is representative of the stability of a suspension. The shear plane (or hydrodynamic radius) corresponds to an imaginary sphere around the particle in which the solvent moves with the particle when the particles move in the solution. The theoretical basis and the determination of the zeta potential are known to the electrochemist, who develops deposits by electrophoresis; it may be deduced from the electrophoretic mobility. There are various techniques and devices sold for directly measuring the zeta potential. When the dry extract is low, it is possible to measure the zeta potential by means of Zetasizer Nano ZS equipment of the Malvern company. This equipment measures, by means of optical devices, the speed of displacement of particles as a function of the electric field applied to them. In addition, it is necessary for the solution to be highly diluted in order to enable the passage of light. When the dry extract is greater, it is possible to measure the zeta potential by means of acoustophoresis techniques, by using, for example, a device called an "acoustosizer" of the Colloidal Dynamics company. The speed of the particles is then measured by acoustic techniques.

"Dispersant" refers to a compound capable of stabilizing the colloidal suspension and in particular of preventing the particles from agglomerating.

An "all-solid multilayer battery" according to the invention is a one-piece battery formed by stacking and assembling a plurality of "elementary cells". An "elementary cell" in the present invention is an electrochemical cell consisting of an anode and a cathode with insertion of lithium ions, separated by a solid electrolyte conducting lithium ions.

An "all-solid" battery is a battery not including a liquid-phase material. "Ms bonding material" refers to any lithium ion-conducting material enabling the anode layer and the cathode layer to be assembled, in which at least one of said anode and cathode layers is covered with an electrolyte layer, thermally treated and/or mechanically compressed, in order to form, by stacking, an all-solid multilayer battery after a low-temperature thermal treatment and/or by mechanical compression of said stack. According to the invention, said Ms bonding material is deposited on at least one of the two faces (layers) deposited by electrophoresis, which will be stacked face-to-face.

Preparation of Colloidal Suspensions "SP+", "SP−" and "SPn" for the Electrophoretic Deposition of Cathode, Anode and Electrolyte Layers.

In order to have a deposition with a perfectly uniform thickness, without roughness and with few defects and as compact as possible, as a result of the electrophoresis deposition method, the deposit is preferably performed with very stable colloidal suspensions SP+, SP−, SPn. The stability of the suspensions is dependent on the size of the particles P+, P−, Pn, as well as the nature of the solvent used and the stabilizer used to stabilize the colloidal suspension. "SP+" refers to a colloidal suspension of particles "P+" containing materials making it possible to obtain a cathode layer, "SP−" refers to a colloidal suspension containing particles P− of materials making it possible to obtain an anode layer, and "SPn" refers to a colloidal suspension of particles "Pn" of materials making it possible to obtain an electrolyte layer.

To facilitate the possible subsequent densification of the deposit and ensure the possibility of producing deposits with very precise thicknesses and profiles (roughness), colloidal suspensions containing nanometer-sized particles are preferred. These particles preferably have an average particle size D50 smaller than 100 nm, and more preferably (in particular if the suspension has particles of materials with a high melting point) smaller than 30 nm. In fact, with small particles, the densification of the deposit is greatly facilitated inasmuch as the deposit is compact.

The production of electrophoretic deposits from stable colloidal suspensions makes it possible to avoid the formation of pores, cavities and clusters adversely affecting the densification of the deposit. In addition, with this technique, it is possible to obtain deposits having excellent compactness, without necessarily having to use mechanical pressing, and regardless of the size of the deposited particles. In addition, when the size of the deposited particles is low, i.e. for particle sizes smaller than 50 nm, the densification of the deposit may begin upon drying, without necessarily requiring thermal treatments; a deposit drying step may suffice in certain cases.

The stability of the suspensions may be expressed by their zeta potential. In the context of this invention, the suspension is considered to be stable when its zeta potential is greater than 40 mV, and very stable when it is greater than 60 mV. However, when the zeta potential is below 20 mV, particle agglomerates may appear. In addition, to ensure good compactness of the layer, the deposits are, in some embodiments, produced with colloidal suspensions having a zeta potential greater than 40 mV (in absolute value). However, in other preferred embodiments in the context of this invention, the suspensions have low dry particle extracts and the zeta potential is less than 40 mV, as will be described in greater detail below.

The colloidal suspensions intended to be used in electrophoresis comprise an electrically insulating solvent, which may be an organic solvent, or demineralized water, or a mixture of solvents, and particles to be deposited. In a stable suspension, the particles do not agglomerate with one another to create clusters capable of producing cavities, agglomerates and/or significant defects in the deposit. The particles remain isolated in the suspension.

In addition, in one embodiment of this invention, the stability of the suspension necessary for obtaining a compact deposit is obtained by the addition of stabilizers. The stabilizer makes it possible to prevent flocculation of powders and the formation of agglomerates. It may act by an electrostatic effect, a steric effect or by a combination of the two effects. Electrostatic stabilization is based on the placement of electrostatic repulsions between the suspended nanoparticles.

Electrostatic stabilization is controlled by the surface charge of the particles; it may consequently be dependent upon the pH. Steric stabilization uses polymers non-ionic surfactants or even proteins, which, added to the suspension, are absorbed at the surface of the particles so as to cause repulsion by congestion of the inter-particular space. A combination of the two stabilization mechanisms is also possible. In the context of this invention, electrostatic stabilization is preferred over steric stabilization. Electrostatic stabilization is easy to implement, reversible, inexpensive and facilitates subsequent consolidation processes.

However, the inventors have observed that, with the nanoparticles of battery materials used in the context of this invention, it is possible to obtain stable colloidal suspensions of particles that are not agglomerated with one another and/or agglomerates of several particles, without the addition of stabilizers. The particles and/or agglomerates preferably have a size of less than 100 nm, and more preferably less than 50 nm.

These suspensions have been obtained for low dry extracts, typically between 2 g/L and 20 g/L, preferably between 3 and 10 g/L and more specifically for dry extracts on the order of 4 g/L in a liquid alcohol phase, preferably ethanol, and/or cetone, preferably acetone. These stable colloidal particle suspensions without the addition of stabilizer are particularly preferred in the context of this invention.

The zeta potential of such suspensions is generally below 40 mV, and more specifically between 25 and 40 mV. This may mean that such suspensions tend to be unstable; however, the inventors have observed that the use of these suspensions for electrophoretic deposition results in very high-quality deposited layers.

Non-volatile organic stabilizers may lead to electrical insulation of the nanoparticles, thus preventing any electrochemical response.

When water is used as a solvent, deposit voltages below 5 V are preferred. In fact, beyond 5 V, the water risks undergoing electrolysis, leading to the production of gas on the electrodes, which renders the deposits porous and reduces their adherence to the substrate. In addition, galvanic reactions in an aqueous medium lead to the formation of metal cations capable of polluting deposits.

In a preferred embodiment, the deposits are produces in a solvent phase. It is thus possible to work at higher voltage values, thus increasing the deposition rates.

According to the invention, the nanoparticles used to produce a cathode layer are preferably, but not entirely, chosen from one or more of the following materials: (i) the oxides: $LiMn_2O_4$, $LiCoO_2$, $LiNiO_2$, $LiMn_{1.5}Ni_{1.5}O_4$, $LiMn_{1.5}Ni_{1.5-x}X_xO_4$ (where X is selected from Al, Fe, Cr, Co, Rh, Nd, other rare earth elements, and where $0<x<0.1$), $LiFeO_2$, $LiMn_{1/3}N_{1/3}CO_{1/3}O_4$; (ii) the phosphates: $LiFePO_4$, $LiMnPO_4$, $LiCoPO_4$, $LiNiPO_4$, $Li_3V_2(PO_4)_3$; (iii) all of the lithiated forms of the following chalcogenides: $V_2O_5$, $V_3O_8$, $TiS_2$, $TiO_yS_z$, $WO_yS_z$, $CuS$, $CuS_2$.

According to the invention, the nanoparticles used to produce an anode layer are preferably, but not entirely, chosen from one or more of the following materials: (i) tin oxynitrides (with a typical formula $SnO_xN_y$); (ii) mixed silicon and tin oxynitrides (typical formula $Si_aSn_bO_yN_z$ with $a>0$, $b>0$, $a+b\rightarrow 2$, $0<y\le 4$, $0<z\le 3$) (also called SiTON), and in particular $SiSn_{0.87}O_{1.2}N_{1.72}$; as well as oxynitrides in the form $Si_aSn_bC_cO_yN_z$ with $a>0$, $b>0$, $a+b\le 2$, $0<c-10$, $0<y<24$, $0<z<17$; $Si_aSn_bC_cO_yN_zX_n$ and $Si_aSn_bO_yN_zX_n$ with $X_n$ at least one of the elements among F, Cl, Br, I, S, Se, Te, P, As, Sb, Bi, Ge, Pb; (iii) nitrides of type $Si_xN_y$ (in particular with $x=3$ and $y=4$), $Sn_xN_y$ (in particular with $x=3$ and $y=4$), $Zn_xN_y$ (in particular with $x=3$ and $y=4$), $Li_{3-x}M_xN$ (with M=Co, Ni, Cu); (iv) oxides $SnO_2$, $Li_4Ti_5O_{12}$, $SnB_{0.6}P_{0.4}O_{2.9}$.

$Li_4Ti_5O_{12}$ nanoparticles for producing an anode layer are more specifically preferred.

To produce the anode or the cathode, it is possible to add, to the aforementioned materials, nanoparticles of electrically conductive materials, and in particular graphite, and/or nanoparticles of lithium ion conducting materials, of the type used to produce electrolyte layers. In fact, certain electrode materials are poor ionic and electric conductors. Consequently, when they are deposited with thicknesses greater than 3 μm, the electrode may be too resistive. Thicknesses of 1 to 10 μm are generally desirable for electrodes in order to have batteries with good energy densities. In this case, it is necessary to produce a co-deposit of electrode material particles and conductive (ionic and/or electric) particles.

The electrolyte must be a good ionic conductor but also an electrical insulator. According to the invention, the nanoparticles used to produce an electrolyte layer are preferably chosen from one or more of the following materials: (a) oxide-based materials chosen from $Li_{3.6}Ge_{0.6}V_{0.4}O_4$; $Li_2O$-$Nb_2O_5$; $LiSiO_4$; $Li_2O$; $Li_{14}Zn(GeO_4)_4$; $Li_{0.35}La_{0.55}TiO_3$; $Li_{0.5}La_{0.5}TiO_3$; $Li_7La_3Zr_2O_{12}$; $Li_{5+x}La_3(Zr_xA_{2-x})O_{12}$ with A=Sc, Ti, V, Y, Nb, Hf, Ta, Al, Si, Ga, Ge, Sn and $1.4\le x\le 2$; (b) nitride or oxynitride-based materials chosen from $Li_3N$; $Li_3PO_{4-x}N_{2x/3}$, $Li_4SiO_{4-x}N_{2x/3}$, $Li_4GeO_{4-x}N_{2x/3}$ with $0<x<4$ or $Li_3BO_{3-x}N_{2x/3}$ with $0<x<3$; lithium and phosphorus oxynitride-based materials (called LiPON) that may contain silicon LiSiPON, boron LiPONB, or sulfur LiPONS or aluminum LiPAON or a combination of aluminum, boron, sulfur and/or silicon; lithium and boron oxynitride-based materials (called LiBON) that may also contain silicon LiSiBON, sulfur LiBONS or aluminum LiBAON, or a combination of aluminum, sulfur and silicon; and more specifically materials of the type $Li_xPO_yN_z$ with $x\sim 2.8$ and $2y=3z$ with $0.16\le z\le 0.46$; or $Li_wPO_xN_yS_z$ with $(2x+3y+2z)=(5+w)$ and $3.2\le x\le 3.8$; $0.13\le y\le 0.4$; $0\le z\le 0.2$; $2.9\le w\le 3.3$; or $Li_tP_xAl_yO_uN_vS_w$ with $(5x+3y)=5$; $(2u+3v+2w)=(5+t)$; $2.9\le t\le 3.3$; $0.84\le x\le 0.94$; $0.094\le y\le 0.26$; $3.2\le u\le 3.8$; $0.13\le v\le 0.46$; $0\le w\le 0.2$; or $Li_{0.9}Si_{0.2}P_{1.0}O_{1.1}N_{1.0}$; or $Li_{2.9}PO_{3.3}N_{0.46}$; (c) sulfide-based materials chosen from $LiM_{1-y}M'_yS_4$ with M=Si, Ge, Sn and M'=P, Al, Zn, Ga, Sb; $Li_2S$; $B_2S_3$; $P_2S_5$; $70Li_2S$-$30P_2S_5$; $Li_7P_3S_{11}$; $Li_{10}GeP_2Si_{12}$; $Li_7PS_6$; $Li_{3.25}Ge_{0.25}P_{0.75}S_4$; $Li_{10}MP_2Si_{12}$ with M=Si, Ge, Sn and mixtures between $Li_2S$ and one of the compounds among $P_2S_5$, $GeS_2$, $Ga_2S_3$ or $SiS_2$; (d) phosphate or borate-based materials chosen from $Li_3PO_4$; $LiTi(PO_4)_3$; $Li_{1+x}AM_{2-x}(PO_4)_3$ (or M=Ge, Ti, and/or Hf and where $0<x<1$); $Li_{1.3}Al_{0.3}Ti_{1.7}(PO_4)_3$; $Li_{1+x+y}Al_xTi_{2-x}Si_yP_{3-y}O_{12}$ (where $0\le x\le 1$ and $0\le y\le 1$); $Li_{1+x+z}M_x(Ge_{1-y}Ti_y)_{2-x}Si_zP_{3-z}O_{12}$ (where $0\le x\le 0.8$, $0\le y\le 1.0$, $0\le z\le 0.6$); $2(Li_{1.4}Ti_2Si_{0.4}P_{2.6}O_{12})$-$AlPO_4$; $Li_xAl_{z-y}Ga_yS_w(PO_4)_c$ or; $Li_xAl_{z-y}Ga_yS_w(BO_3)_c$ or $Li_xGe_{z-y}Si_yS_w(PO_4)_c$ or; $Li_xGe_{z-y}Si_yS_w(BO_3)_c$ or more generally $Li_xM_{z-y}M'_yS_w(PO_4)_c$ or $Li_xM_{z-y}M'_yS_w(BO_3)_c$ with $4<w<20$, $3<x<10$, $0\le y\le 1$, $1\le z\le 4$ and $0<c<20$ and M or M' an element among Al, Si, Ge, Ga, P, Zn, Sb; (e) mixed materials chosen from the mixtures between $Li_2S$ and one of the compounds among $Li_3PO_4$, $Li_3PO_{4-x}N_{2x/3}$, $Li_4SiO_{4-x}N_{2x/3}$, $Li_4Ge_{O4-x}N_{2x/3}$ with $0<x<4$ or $Li_3BO_{3-x}N_{2x/3}$ with $0<x<3$; the mixtures between $Li_2S$ and/or $B_2S_3$, $SiS_2$, $P_2S_5$, $GeS_2$, $Ga_2S_3$ and a compound of the type LiaMOb which may be a lithium silicate $Li_4SiO_4$, a lithium borate $Li_3BO_3$ or a lithium phosphate $Li_3PO_4$.

Once the desired target chemical composition has been defined, i.e. the nature of the powder or powder mixtures, the nanoparticles are suspended in a suitable liquid phase. In certain embodiments, a stabilizer is added in order to obtain a suspension in which the zeta potential is preferably greater than 40 mV.

However, advantageously, suspensions containing few or no stabilizers (<10 ppm), and in particular suspensions having low dry extracts (generally below 20 g/L and preferably below 10 g/l), and in particular suspensions containing particles having a size smaller than 100 nm, and preferably smaller than 50 nm, are used. In this case, the zeta potential of the suspension is generally between 25 and 40 mV. As an example, the solvents used may be based on cetone, alcohol or a mixture of the two.

Among the steric stabilizers that can be used, it is possible to cite in particular polyethylene imine (PEI), polyacrylic acid (PAA), citric acid, nitrocellulose or acetylacetone, on the condition that they are soluble in the organic solvent chosen.

Electrostatic stabilizations may be performed by adding iodide, acids or bases.

The electrical conductivity of the suspension may be controlled so as to obtain a high potential gradient between the two electrodes. Preferably, the conductivity of the colloidal suspension is between 1 and 20 µS/cm. Acids and bases, weak or strong, may be added in small quantities to control the conductivity of the suspension and charge the surfaces of the particles.

To obtain a stable suspension, with nanometer-sized particles without agglomerates, it may be necessary to perform a step of grinding and/or dispersion of powders, prior to the suspension thereof, in order to de-agglomerate the particles and possibly adjust the size thereof (to obtain an average size smaller than 100 nm or even smaller than 30 nm) and reduce the size dispersion. Ultrasound may also be implemented in order to help with the de-agglomeration and the suspension of the particles.

Defects created in the particles during the dispersion grinding steps are also capable of reducing the densification temperature, as is performing mechanical compressions.

Deposition of Anode, Cathode and Solid Electrolyte Layers by Electrophoresis

According to the invention, the anode, cathode and solid electrolyte are all deposited by electrophoretic means. The electrophoretic deposition of particles is performed by applying an electric field between the substrate on which the deposition is performed and a counter-electrode, enabling the charged particles of the colloidal suspension to be moved, and deposited on the substrate. The absence of binders and other solvents deposited at the surface with the particles makes it possible to obtain very compact deposits. The compactness obtained by electrophoretic deposition limits or even prevents the risks of cracking or the appearance of other defects in the deposit during the drying steps. However, to produce thick deposits, the implementation of successive deposition/drying steps may be envisaged. The absence of organic compounds reduces the risk of combustion of the battery in the event of an accidental short-circuit.

In addition, because the deposit obtained by electrophoresis does not contain binders or other organic compounds, the method according to this invention does not require steps of burning or evaporation of corrosive or harmful compounds before sintering. The growing economic and environmental constraints make it necessary to reduce emission of waste in the atmosphere. This invention thus satisfies these constraints.

In addition, the deposition rate may be very high according to the electric field applied and the electrophoretic mobility of the particles of the suspension. For an applied voltage of 100 V/m, deposition rates on the order of several µm/min may be obtained.

The inventors have observed that this technique makes it possible to produce deposits on very large surfaces with excellent uniformity (on the condition that the concentrations of particles and electric fields are homogeneous over the surface of the substrate). It is also suitable for a continuous strip method, i.e. the substrate is advantageously a strip; during the electrophoresis deposition, the strip is advantageously stationary with respect to the liquid phase.

The substrate may be a sheet or a strip having a conductive surface or conductive elements, for example conductive zones. The nature of the substrate in contact with the electrodes must be inert and must not interfere and lead to parasitic reactions in the potential range of operation of the Li-ion battery. As an example, a copper or aluminum strip, having a thickness that may be, for example 6 µm, may be used, or a polymer strip having an electrically conductive surface deposit (also called a metalized polymer film here).

Figure 3:
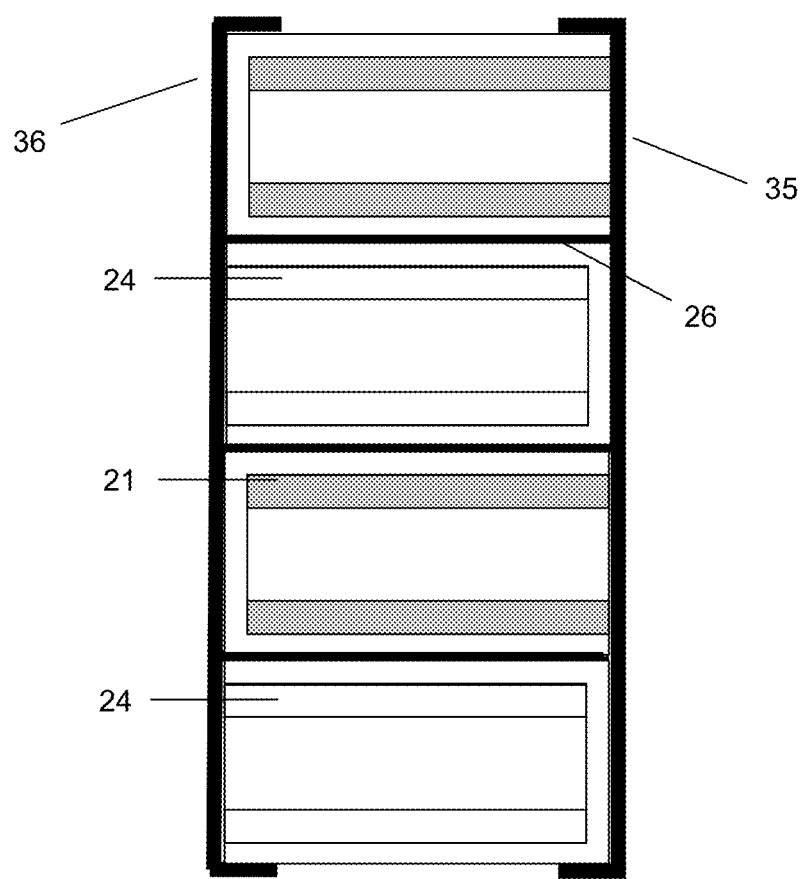
FIG. 3 shows an assembly of a battery according to one of the embodiments of the invention.

In the context of this invention, the substrate must have a low thickness so that fine cutouts of the electrodes can be produced, as better shown in FIGS. 3 and 10. Metal and/or metalized polymer films are preferred.

The advantage of the method according to the invention is that it makes it possible to produce "all-solid" multilayer structures at low temperature. Thus, substrates based on metalized polymer films may also advantageously be used. Such films may be produced industrially with thicknesses on the order of 1 µm, which makes it possible to increase the volume energy density of the thin-film batteries.

Advantageously, to improve the quality of the electric contacts and prevent the appearance of parasitic reactions with the electrode materials, coated current collector surfaces are coated with noble metals and transition metals by metallization. Preferably, the metals capable of being deposited at the surface of the current collectors are selected from the following metals: gold, platinum, palladium, vanadium, cobalt, nickel, manganese, niobium, tantalum, chromium, molybdenum, titanium, palladium, zirconium, tungsten or any alloy containing at least one of these metals. Alternatively, conductive oxide films such as indium-tin oxide (ITO) may be used as a coated on the substrate in order to improve the qualities of the contact between the substrates and the electrodes.

Preferably, these coatings must remain thin and their thickness must not be greater than 500 nm, and preferably the thicknesses of the surface metallization layers will be on the order of 100 nm. These metallization layers may be produced on films, thin metal strips, for example of aluminum or copper. Preferably, the thickness of these strips is less than 20 µm, more preferably less than 10 µm, and even more preferably less than or equal to 5 µm.

The metalized polymer films must also have low thicknesses, preferably below 5 µm, and more preferably on the order of 1 µm. The nature of the metallization layers is described above, and the films may be made of polyethylene naphthalate (PEN), polyethylene terephthalate (PET), polypropylene (PP), or Teflon® (PTFE), polyimide (PI) and more specifically Kapton® for the processes requiring heat treatments of 300° C.

Preferably, the roughness of the substrates does not exceed 10% of the thickness of the deposited electrode in order to ensure optimal contact between the battery elements and ensure homogeneity of the electrode properties.

The substrate may be prepared, for example, as follows: an aluminum strip having a thickness of between 5 and 20 µm, and preferably on the order of 15 µm, is provided. The strip is then positioned so as to be kept "flat". The surface of the aluminum strip is preferably cleaned, for example by immersion in a cleaning bath. This cleaning may, for example, be performed by immersions in an NGL technology detergent bath under ultrasound, followed by rinsing with distilled water. Advantageously, the strip is treated by electropolishing in order to reduce its thickness, and/or remove surface roughnesses and microroughnesses. This electropolishing treatment may be performed in a solution having the following chemical composition: 80% absolute ethanol, 13.8% distilled water, 6.2% perchloric acid at 70%. The voltage applied is on the order of 15V. If necessary, the treatment bath may be cooled in order to prevent heating associated with the high current densities.

For a better surface quality, other bath formulations may be used, such as, for example, baths based on EPS 1250 or EPS 1300 solutions of EP Systems. After the electropolishing treatment, the surface is rinsed with distilled water. The thickness of the strip after this treatment is generally between 1 and 10 µm. This strip is advantageously used as an anode substrate and as a cathode substrate in the method according to the invention.

Advantageously, a nickel plating treatment may be performed directly on the surface of the aluminum strip just after the electropolishing treatment thereof. This treatment may be performed in different ways, by electrochemical deposition, by immersion in a solution containing nickel salts, or both in succession. As an example, the electrolytic deposition may be performed in a bath with the following composition: nickel sulfamate at 300 g/l, $H_3BO_3$ at 30 g/l, $NiCl_2$ at 30 g/l. The nickel plating is performed on the aluminum strip, the surface of which has been pre-activated by electropolishing under a current density on the order of 2 A/dm2, using a nickel counter-electrode. This nickel plating treatment makes it possible to prevent the formation of an oxide layer at the surface of the aluminum, and to improve the quality of the electrical contacts and the adhesion of the deposits.

The aforementioned treatment may be performed with other metals capable of being deposited on the surface of the aluminum strip, as described above, i.e. gold, platinum, palladium, vanadium, cobalt, manganese, niobium, tantalum, chromium, molybdenum, titanium, palladium, zirconium, tungsten, nickel or any alloy including at least one of these metals. The deposition may be performed by techniques well known to a person skilled in the art, and in particular by chemical vapor deposition, or physical deposition, in particular by evaporation and/or physical vapor deposition.

The thickness of each of the cathode and anode layers is preferably between 0.5 µm and 10 µm. The thickness of the electrolyte layer is preferably less than 2 µm, and even more preferably less than 1 µm.

After the deposition of the cathode layer and the anode layer each on a conductive substrate, a mechanical densification step (for example by pressing) may be performed in order to further compact the particles and cause deformations of the particles that will further facilitate the subsequent densification.

However, it is preferable in other embodiments to perform a thermal treatment before the mechanical densification step.

In certain specific embodiments according to the invention, it is not necessary to perform a thermal and/or mechanical densification step, because the layer deposited by electrophoresis is already dense and compact. In fact, the inventors have observed that when stable particle suspensions are obtained with little or no stabilizer (<10 ppm), the layer obtained after deposition by electrophoresis is dense and compact, without any thermal and/or mechanical densification having been performed, ad this is especially true when the size of the particles deposited by electrophoresis is smaller than 50 nm.

The deposition by electrophoresis may be implemented in a "batch"-type method (static) or in a continuous method. FIGS. 5a and 5b show different embodiments of depositions by electrophoresis, for producing both strips and coatings on a conductive substrate.

During electrophoretic deposition, a stabilized supply makes it possible to apply a voltage between the conductive substrate and two electrodes located on either side of said substrate. This voltage may be direct or alternating. A precise monitoring of the currents obtained makes it possible to monitor and precisely check the thicknesses deposited. When the deposited layers are insulating, according to their thickness, they may assign the value of the electric field, and, in this case, a controlled-current deposition mode is preferred. According to the resistivity of the interface, the value of the electric field is modified.

FIG. 5a schematically shows a system for implementing the method according to the invention. The electrical supply located between the counter-electrodes 43 and the conductive substrate 44 is not shown. An electric field is applied between the two counter-electrodes 43 and the substrate 44 in order to deposit particles of the colloidal suspension 42 on the two faces of the substrate 44.

The reel of the electrically conductive strip 44 serving as a substrate is unwound from an unwinder 41. After the deposition, the deposited layer is dried in a drying oven 45, then consolidated by mechanical compaction by means of a suitable compaction 46. The compaction may be performed under a controlled atmosphere and for temperature between ambient temperature and the melting temperature of the deposited materials.

The representation of FIG. 5a is beneficial in the production of deposits of active materials on current collectors used to produce battery electrodes. However, it is possible to coat only one face of the substrate. In addition, FIG. 5b shows a device for producing a coating on a single conductive face, without mechanical densification.

In addition, this deposition technique enables perfect coating of the surface regardless of its shape and the presence of asperity defects. It therefore makes it possible to guarantee the dielectric properties of the deposit.

The absence of mechanical contacts makes it possible to produce these deposits on extremely large surfaces. In fact, with known deposition techniques such as roll coat, doctor blade, and so on, it is difficult to guarantee a perfect homogeneity of thickness on wide substrates, which causes the coating lines often to be limited in width. As an example, when powerful Li-ion battery deposits are to be produced, in other words, thin deposits, the maximum strip width is around 200 to 300 mm, which significantly limits the production capacity of the coating lines according to the prior art.

When materials with little or no electrical conductivity are deposited on the surface of a substrate, the possible zones less well coated are more conductive and thus locally concentrate a higher deposition rate, which tends to compensate for or even suppress the defect. The deposits obtained are thus intrinsically of excellent quality, have few defects and are highly homogeneous.

Figure 4:
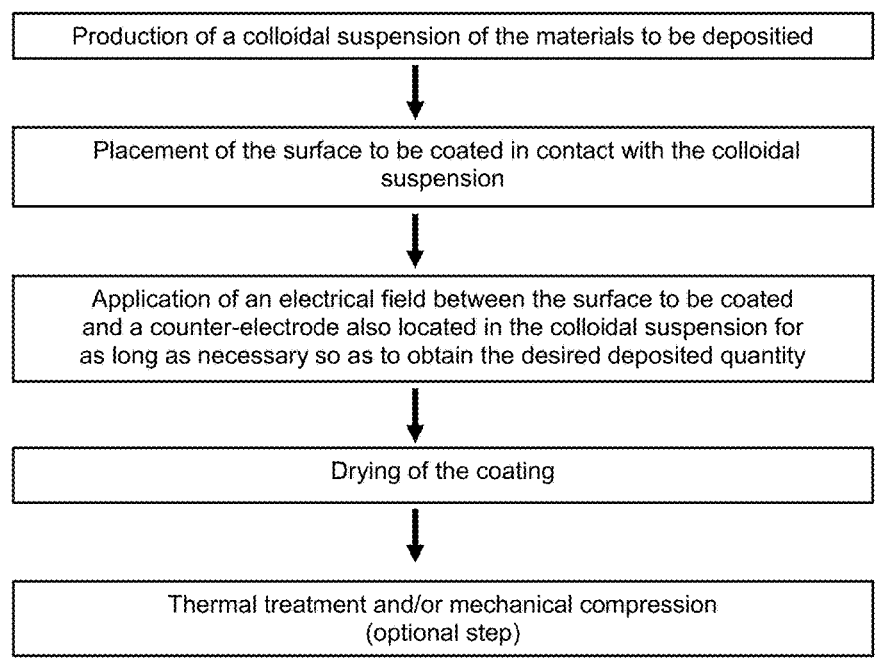
FIG. 4 is a diagram showing a typical embodiment of the electrophoresis deposition method.

The diagram of FIG. 4 shows a typical embodiment of the method according to the invention.

Step 1: Preparation of suspensions. In a first step, powders of the chemical composition of the desired coating are used.

Step 2: Immersion of a metal substrate in the colloidal suspension. The colloidal suspension may cover the entire surface of the substrate. In a specific embodiment, a mask may be applied to the surface of the substrate in order to limit the surface in contact with the suspension and consequently reduce the deposition surface.

Step 3: Application of an electric field between the substrate and a counter-electrode located in the colloidal suspension. This electric field may be constant and/or variable (alternating). The mean direction of the electric field, i.e. the potential applied to the electrodes, is adapted to the charge of the particle to be deposited (cataphoresis or anaphoresis).

Step 4: The drying conditions are dependent on the deposited thickness as well as the nature of the solvent.

Step 5: densification of the deposit (optional step according to certain specific embodiments according to the invention).

In certain embodiments according to the invention, more specifically when the sizes of particle in the colloidal suspensions are smaller than 50 nm, there is no longer a distinction between the drying step (fourth step) and the thermal consolidation treatment step (fifth step) because they begin to densify during drying. The densification of the deposit during drying may be explained by a plurality of parameters, including the physicochemical characteristics of the particles, in particular their chemical nature, their size, their melting point, their modulus of elasticity, but may also be related to the presence of stabilizers, as well as the type of solvent used, as well as the nature of the electric field.

Densification of the Deposit of the Anode, Cathode and/or Electrolyte Layer

In a specific embodiment according to the invention, the deposited layers, i.e. the anode, cathode and/or electrolyte layer, are densified by thermal treatment and/or mechanical compression, in order to minimize the cavities, pores, cracks and other defects of compactness. This step of densification of the deposit may be performed: (i.) by mechanical means, in particular by uniaxial compression. The pressure applied is preferably between 10 and 100 MPa; a value on the order of 50 MPa gives very good results; In other embodiments, the pressure applied is greater than 250 MPa, or even greater than 400 MPa; (ii.) by a thermal treatment. The temperature is strongly dependent upon the chemical composition of the powders deposited. According to the nature of the materials deposited, it may be useful also to maintain a controlled atmosphere in order to prevent deterioration of the properties of the coating; (iii.) by a combination of thermal and mechanical means, in particular by sintering under pressure.

In another embodiment according to the invention, the anode and cathode layers deposited are not subjected to a thermal treatment and/or mechanical compression after their deposition when they are capable of being dense and compact directly after their deposition. In fact, when the anode and cathode layers are deposited by electrophoresis from colloidal suspensions having a very small particle size, typically particle sizes smaller than 50 nm, and when said suspensions contain little or no stabilizer (on the order of several ppm), the nanoparticles deposited may begin to consolidate and directly form a dense deposit under the influence of the electrostatic pressure exerted by the electric field and applied during the deposition step. This mechanism is more pronounced as the deposited particles are insulating, small, have a low melting temperature and are deposited with high electric fields. Thus, such nanoparticle suspensions make it possible to produce thin, dense deposits containing very few defects. The constraints associated with consolidation are significantly reduced and it is thus possible after consolidation to produce thin, dense films without cracks, the small residual shrinkages occurring in the direction of the thickness of the film.

In some cases, even if the consolidation has started during drying, it is in some cases preferable to complete it with a thermal treatment at a higher temperature.

In addition, the deposition by electrophoresis of such materials makes it possible to work directly on metal substrates and/or metalized films, unlike the conventional techniques of sintering powders contained in inks, having production constraints associated with the consolidation temperature and the associated problem of shrinkages.

The substrate on which the battery layers are deposited is comprised of a generally metallic electrically conductive material. When the substrate is metallic, it is preferable to avoid heating it to high temperatures during production of the battery, in order to prevent any risk of oxidation and deterioration of the surface properties. The reduction of surface oxidation is particularly beneficial for reducing electrical contact resistances, which is essential for the operation of energy production and/or storage devices.

Obtaining very high-quality electrophoretic layers as described above, and in particular compact layers, makes it possible to reduce the time and temperature of the thermal treatments and limit the shrinkage of said treatments, and obtain a homogeneous nanocrystalline structure. This helps to obtain dense layers without defects.

The inventors have observed that the smaller the size of the deposited particles, the more the thermal treatment temperature can be reduced, or even be optional when the particle size is smaller than 100 nm, and preferably smaller than 50 nm. It is thus possible to produce deposits in thin or relatively thick layers, with porosity rates of less than 5% or even 2% without requiring significant thermal treatment temperatures and/or times. In addition, this technology for compaction of deposits at low temperature considerably reduces the risks of shrinkage. Moreover it is no longer necessary to use very complex and costly thermal treatment cycles in order to consolidate the ceramic deposits of the battery electrolyte and electrode layers.

During the mechanical and/or thermal densification phase, when necessary, it may be advantageous to work in a vacuum, or in an inert atmosphere in order to prevent the appearance of pollution on the particle surfaces that may be detrimental to the particle densification mechanism.

For particle sizes such as those used in the method according to the invention, it is the increase in surface energies that becomes the main driving force of the densification by thermal treatment; this is reflected by a significant reduction in densification temperatures when the particle size decreases. However, in order for this consolidation temperature reduction to be effective, it may be necessary for the particles first to be mechanically compacted, and/or deposited with a compact stack. In this case, the multiplication of mechanical contacts between these particles enables the diffusion processes causing the densification to be facilitated. In addition, to compact the deposits, pressing operations are generally applied. This technique of compaction by pressing (calendering) is well adapted to deposits formed by micron-sized or larger particles.

The presence of agglomerates and inter-agglomerate cavities also influences densification. The greater their sizes, the more the diffusion distance increases and the higher the densification temperature is to obtain good densification. Thus, with nanoparticles deposited by electrophoresis, it is possible to approach the theoretical geometric density of a compact stack of spheres (74%) without a mechanical compaction step.

The significant compactness of the deposit obtained by electrophoresis, and the small quantity of solvent to be evaporated, very substantially limits the risk of appearance of cracks after drying. In addition, the small size of the particles and the large specific surface thereof tends to facilitate the steps of consolidation by a thermal treatment (sometimes called "sintering" in this context). The densification by thermal treatment of the deposit, when necessary, may thus be performed at temperatures not exceeding 0.7 Tf, or even 0.5 Tf or 0.3 Tf, where Tf is the melting or decomposition temperature (expressed in ° C.) of the massive chemical composition material identical to that of the deposited particle. When a plurality of particles are co-deposited, the most fusible of them must be considered. To further reduce this densification temperature, it is also possible to apply a mechanical compression to said deposit in order to further increase its compactness, and/or create point defects that will help to accelerate the densification method and the production of layers without porosities. Such a production method may be used directly on substrates such as aluminum strips, having low melting temperatures.

As the nanoparticles are highly sensitive to surface pollution, it is preferable to perform these consolidation treatments in a vacuum or in an inert atmosphere.

Deposition of an Ms Bonding Material Layer

After the step of deposition by electrophoresis of an anode and a cathode layer, each on a conductive substrate, or after the step of depositing an electrolyte layer on the anode layer and/or the cathode layer, the layers obtained may be dense, in particular when the sizes of particle "P+" "P−" and "Pn" are extremely small, i.e. particle sizes smaller than 100 nm, and preferably smaller than 50 nm. The inventors have observed that the assembly of layers with one another may be difficult and it is thus necessary to supply (thermally and/or mechanically) a large amount of energy in order to bond them. The use of high temperatures to assemble layers is very disadvantageous because they layers may be oxidized, problems of inter-diffusion in the layers may occur and collectors may be significantly deteriorated.

According to an essential aspect of this invention, to facilitate the stacking of layers obtained by electrophoretic deposition, before said stacking step, an Ms bonding material layer is deposited: (i) directly on the face of the anode or cathode layer obtained by electrophoresis; or (ii) on the face of the anode and/or cathode layer coated with an electrolyte layer obtained by electrophoresis; or (iii) on the face of the anode layer coated with an electrolyte layer and on the face of the cathode layer obtained by electrophoresis; or on the face of the anode layer and on the face of the cathode layer coated with an electrolyte layer obtained by electrophoresis.

The Ms bonding material layer must be, like the electrolyte, a good lithium ion conductor.

The melting point of the bonding material layer as deposited must be lower than that of the layers with which it is in contact. This may result from the choice of Ms material, but also the form thereof in the layer. In particular, it is known that the melting point of a material in the form of nanoparticles is lower than the melting point of dense material, which is associated with the high surface energy of the nanoparticles.

In an advantageous embodiment, the Ms bonding material is deposited in the form of a layer comprised of nanoparticles, for example by electrophoresis, and/or in the form of a very thin layer (for example having a thickness of less than 50 nm or 20 nm) so as to reduce the temperature of the thermal treatment performed in step d). It is then possible to stack, face-to-face, two dense layers by depositing an Ms bonding material layer on at least one of said two dense layers, the temperature of the thermal treatment TR of step d) enabling said two dense layers to be bonded, if performed, being lower than the melting temperature of the material(s) forming the dense layers.

In one embodiment, which shows the possibility of the method according to the invention for producing a mechanical stack of two identical materials, as the Ms bonding material, a thin layer of nanometric particles of electrolyte material is deposited on a densified electrolyte layer, then, on said thin bonding material layer, a second densified electrolyte layer is stacked (typically by mechanical means), and the assembly is subjected to a thermal treatment and/or mechanical densification treatment, during which the bonding material will ensure the bonding between the two electrolyte layers. This bonding probably occurs by a mechanism of diffusion or migration of more fusible bonding material, in the direction of the less fusible but chemically identical layers with which it is in contact.

In general, to assemble, by stacking, said layers obtained by electrophoresis, the Ms bonding material is chosen from one or more of the following materials: (a) oxide-based materials chosen from $Li_{3.6}Ge_{0.6}V_{0.4}O_4$; $Li_2O-Nb_2O_5$; $LiSiO_4$; $Li_2O$; $Li_{14}Zn(GeO_4)_4$; $Li_{0.35}La_{0.55}TiO_3$; $Li_{0.5}La_{0.5}TiO_3$; $Li_7La_3Zr_2O_{12}$; $Li_{5+x}La_3(Zr_x,A_{2-x})O_{12}$ with A=Sc, Ti, V, Y, Nb, Hf, Ta, Al, Si, Ga, Ge, Sn and $1.4 \leq x \leq 2$; (b) nitride- or oxynitride-based materials chosen from $Li_3N$, $Li_3PO_4-xN_{2x}/3$, $Li_4SiO_4-xN_{2x}/3$, $Li_4GeO_4-xN_{2x}/3$ with 0<x 4 or $Li_3BO_3-xN_{2x}/3$ with 0<x<3; lithium and phosphorus oxynitride-based materials (called LiPON) that may also contain silicon (called LiSiPON), boron (called LiPONB), sulfur (called LiPONS) or aluminum (called LiPAON) or a combination of aluminum, boron, sulfur and/or silicon; the lithium and boron oxynitride-based materials (called LiBON) may also contain silicon (called LiSiBON), sulfur (called (LIBONS) or aluminum (called LiBAON) or a combination of aluminum, sulfur and silicon; and more specifically materials of the $Li_xPO_yN_z$ type with x~2.8 and 2y=3z with $0.16 \leq z \leq 0.46$; or $Li_wPO_xN_yS_z$ with $(2x+3y+2z)=(5+w)$ and $3.2 \leq x \leq 3.8$; $0.13 \leq y \leq 0.4$; $0 \leq z \leq 0.2$; $2.9 \leq w \leq 3.3$; or $Li_tP_xAl_yO_uN_vS_w$ with $(5x+3y)=5$; $(2u+3v+2w)=(5+t)$; $2.9 \leq t \leq 3.3$; $0.84 \leq x \leq 0.94$; $0.094 \leq y \leq 0.26$; $3.2 \leq u \leq 3.8$; $0.13 \leq v \leq 0.46$; $0 \leq w \leq 0.2$; or $Li_{1.9}Si_{0.2}P_{1.0}O_{1.1}N_{1.0}$; or $Li_{2.9}PO_{3.3}N_{0.46}$; (c) sulfide-based materials chosen from: LixM1-yM'yS4 with M=Si, Ge, Sn and M'=P, Al, Zn, Ga, Sb; Li2S; B2S3; P2S5; 70Li2S-30P2S5; Li7P3S11; Li10GeP2S12; Li7PS6; Li3.25Ge0.25P0.75S4; Li10MP2S12 with M=Si, Ge, Sn and mixtures between Li2S and one of the compounds among P2S5, GeS2, Ga2S3 or SiS2; (d) phosphate or borate-based materials chosen from Li3PO4; LiTi(PO4)3; Li1+xAlxM2-x(PO4)3 (where M=Ge, Ti, and/or Hf and in which 0<x 1); Li1.3Al0.3Ti1.7(PO4)3; Li1+x+yAlxTi2-xSiyP3-yO12 (in which 0≤x≤1 and 0≤y≤1); Li1+x+zMx(Ge1-yTiy)2-xSizP3-zO12 (in which 0≤x≤0.8, 0≤y≤1.0, 0≤z≤0.6); 2(Li1.4Ti2Si0.4P2.6O12)-AlPO4; LixAlz-yGaySw(PO4)c or LixAlz-yGaySw(BO3)c or LixGez-ySiySw(PO4)c or LixGez-ySiySw(BO3)c or more generally LixMz-yM'ySw(PO4)c or LixMz-yM'ySw(BO3)c with 4<w<20, 3<x<10, 0≤y≤1, 1≤z≤4 and 0<c<20 and M or M' an element among Al, Si, Ge, Ga, P, Zn, Sb; (e) mixed materials chosen from the mixtures between Li2S and one of the compounds among Li3PO4, Li3PO4-xN2x/3, Li4SiO4-xN2x/3, Li4GeO4-xN2x/3 with 0<x<4 or Li3BO3-xN2x/3 with 0<x<3; the mixtures between Li2S and/or B2S3 SiS2, P2S5, GeS2, Ga2S3 and a compound of the LiaMOb type, which may be a lithium silicate Li4SiO4, a lithium borate Li3BO3 or a lithium phosphate Li3PO4.

In an alternative embodiment, the Ms bonding material comprises/consists of at least one polymer impregnated with a lithium salt, the polymer preferably being chosen from the group formed by polyethylene oxide, polyimides, vinylidene polyfluoride, polyacrylonitrile, polymethyl methacrylate, polysiloxanes, and the lithium salt preferably being chosen from LiCl, LiBr, LiI, Li(ClO4), Li(BF4), Li(PF6), Li(AsF6), Li(CH3CO2), Li(CF3SO3), Li(CF3SO2)2N, Li(CF3SO2)3, Li(CF3CO2), Li(B(C6H5)4), Li(SCN), Li(NO3).

The deposition of the Ms bonding material layer may be performed indifferently by one of the following techniques: (i.) vacuum deposition technique, and more specifically physical vapor deposition, chemical vapor deposition, or plasma-enhanced chemical vapor deposition; or (ii.) sol-gel deposition technique; or (iii.) suspended nanoparticle deposition technique, more specifically inking, dipping, centrifugation (spin-coating), and Langmuir-Blodgett techniques; (iv.) electrospraying technique; (v.) aerosol deposition technique; or (vi.) electrophoresis deposition technique.

To guarantee good electrode performance, these deposits must be thin, preferably less than 200 nm, and even more preferably less than 100 nm so as not to produce excessive resistive effects in the battery cell.

The sol-gel deposition techniques make it possible to produce a compact deposit of "Ms" bonding material. This technique is very suitable for the production of layers having a thickness of less than 200 nm.

It is also possible to deposit an Ms bonding material layer using a suspension previously containing nanoparticles of Ms bonding material in a suitable liquid that will then be evaporated. It more specifically involves inking, dipping, spin-coating or Langmuir-Blodgett techniques.

Electrospraying deposition techniques may also be used to produce deposits of Ms bonding material in the form of nanoparticles. This deposition is performed by spraying chemical compounds reacting under the influence of the electric field to form, at the surface, an Ms bonding material layer after drying. Such a deposition technique is described in the article "The production of thin film of LiMn2O4 by electrospraying", J. of Aerosol Science, Vol. 25, no 6, p. 1229-1235.

In another embodiment, the deposition of nanoparticles of Ms bonding material may be performed by the "aerosol" deposition technique. The Ms material nanoparticles contained in a tank are moved by injecting a pressurized gas into the container. A deagglomeration device may be installed on the particle jet in order to break up the agglomerates and ensure a flow of particles of controlled sizes.

Finally, the electrophoresis deposition technique, as described above for depositing an anode, cathode and electrode layer, makes it possible to obtain a thin Ms bonding material layer.

After the deposition of the Ms material layer on the face of at least one of the layers obtained by electrophoresis, said layers are stacked face-to-face, then mechanically compressed and/or thermally treated in order to obtain a battery having a stacked all-solid multilayer structure. Preferably, the thermal treatment of the layers to be assembled is performed at a temperature TR which, preferably, does not exceed 0.7 times the melting or decomposition temperature (expressed in ° C.), and more preferably does not exceed 0.5 times (and even more preferably does not exceed 0.3 times) the melting or decomposition temperature (expressed in ° C.) of the Ms bonding material.

Advantageously, the mechanical compression of the layers to be assembled is performed at a pressure of between 10 and 100 MPa, preferably between 10 and 50 MPa.

The total thickness of the Ms bonding material layer is also dependent upon the nature of the layers to be assembled. For example, if one wants to assemble the cathode layer and an anode layer each coated with a solid electrolyte layer, the thickness of the Ms bonding material layer must be very low, i.e. below 100 nm, preferably below 50 nm and even more preferably below 30 nm, in order for the electrolyte obtained to remain a good ionic conductor. Finally, if one wants to assemble an anode layer (or a cathode layer) not coated with an electrolyte layer, the thickness of the Ms bonding material layer is below 100 nm, preferably below 50 nm and even more preferably below 30 nm. Advantageously, the size of the Ms material particles is smaller than the thickness of the layer on which the Ms material is deposited.

Assembly of a Battery

FIGS. 6 and 7 schematically show the steps of production of a battery according to different embodiments of the method according to the invention. These embodiments are in no way limiting but are provided as an illustration.

Figure 1A:
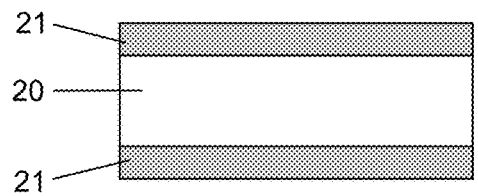

The product obtained in each step is shown schematically in FIGS. 1a to 1d according to a first embodiment of the invention (FIG. 6). In steps 1.A and 1.B, a cathode 24 and anode 21 layer, respectively, is deposited by electrophoresis, on the conductive substrate 20. As shown in FIG. 1a for the anode 21, this deposition can be performed on the two faces of the conductive substrate. In steps 2.A and 2.B, the layer deposited by electrophoresis is dried.

In a specific embodiment of the invention, the deposit is densified in steps 3.A and 3.B by mechanical and/or thermal means. This mechanical densification makes it possible to obtain a density greater than 90% of the theoretical density of the massive body, or even greater than 95%. The drying can be performed before or after mechanical densification. When the cathode layer and/or the anode layer are dense and compact after the drying step, steps 3.A and 3.B are unnecessary.

Figure 1B:
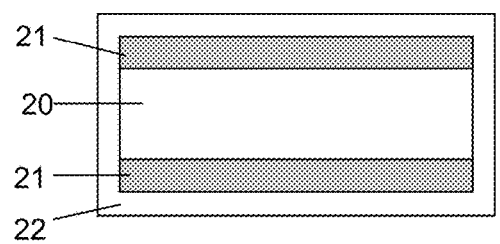
Figure 1C:
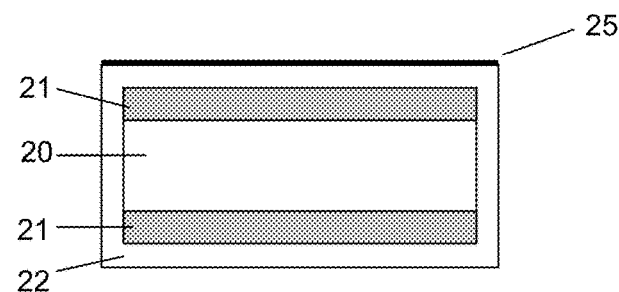

In steps 4.A and 4.B, an electrolyte layer 22 is deposited on the anode 21 and on the cathode 24, respectively, (FIG. 6). Its thickness is preferably less than 3 μm. This thickness also covers the edges of the electrodes, as schematically shown in FIG. 1b. This insulation of the electrode edges prevents both the risk of short-circuit and the risk of leakage currents. It also makes it possible to simplify the encapsulation. Certain lithium ion-conducting ceramics and/or glass-ceramics may also protect the cell from the external environment. A single encapsulation layer in the form of a polymer or silicone may then be used to protect the battery cell. In steps 5.A and 5.B, said electrolyte deposit is dried.

In a specific embodiment according to the invention, the deposit is densified in steps 6.A and 6.B by mechanical and/or thermal means. This step is unnecessary when the electrolyte layer obtained is already dense and compact after the drying step.

In another embodiment, as shown in FIG. 7, the electrolyte layer 22 is deposited only on the cathode 24. Its thickness is preferably below 1 μm. This deposit also covers the edges of the electrodes, as schematically shown in FIG. 1b. This insulation of the electrode edges prevents both the risk of short-circuit and the risk of leakage currents. In step 5.A, said electrolyte deposit is dried.

In steps 7.A and 7.B (FIGS. 6 and 7) a layer of Ms bonding material is deposited on the face of at least one of said two layers obtained by electrophoresis and which will be stacked face-to-face.

Figure 1D:
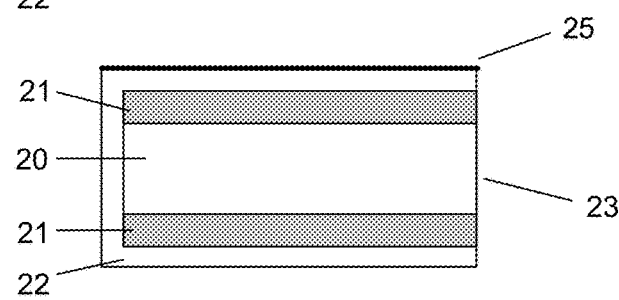
Figure 1E:
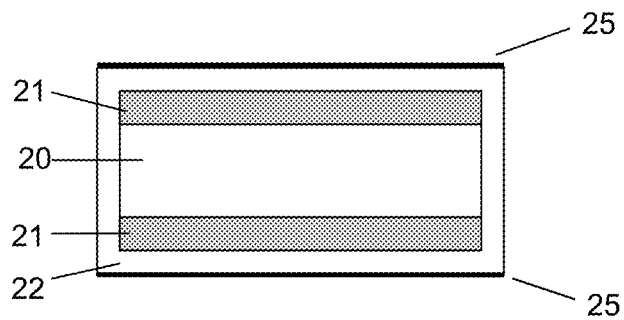
Figure 1F:
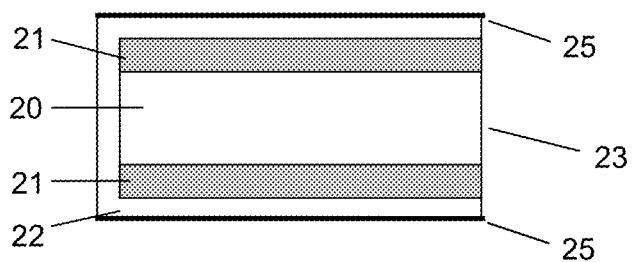

In steps 8.A and 8.B, an edge of the electrodes is cut as shown in FIG. 1d or 1f. Advantageously, the edge connected to the strip is cut so as to leave three edges coated with electrolyte on the edge. As said electrolyte is a dielectric substance, it will make it possible in the next stacking step to expose only the anode contacts on one side of the cell, and cathode contacts on the other side, respectively, in order to form parallel assemblies of the battery elements so as to form a higher-capacity battery cell. FIG. 1(d) or 1(f) schematically shows such a cell cross-section after cutting: the substrate 20 has been coated (in this case on both faces) with a cathode layer 21 and cut on an edge 23.

Figure 2:
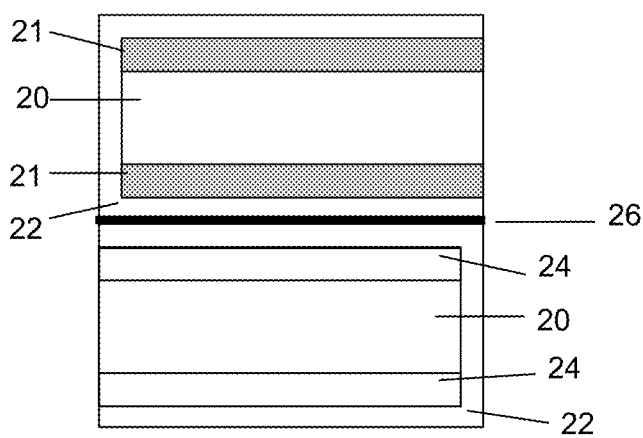
FIG. 2 shows a stack of an anode and a cathode covered with an electrolyte layer and an Ms bonding material layer.

In step 9, the stack is produced so that, on two opposite sides of the stack, there is alternately a series of cut anode 21 edges 23 and cathode 24 edges, optionally coated with electrolyte 22, and optionally coated with the Ms bonding material layer 25. FIG. 2 shows a stack of two substrates 20, one of them having, on both faces, an anode layer 21 coated with an electrolyte 22, and an Ms bonding material layer 25 on a single face of the electrolyte layer 22, the other a cathode layer 24 coated with an electrolyte layer 22 and an Ms bonding material layer 25 on the two faces of the electrolyte layer 22, the two faces of the electrolyte layer 22 deposited respectively on the anode 21 and the cathode 24 and each coated with an Ms bonding material layer 25 being placed one on the other so as to form a common interface 26.

In step 10, a thermal treatment and/or mechanical compression is carried out, promoting contact between the two layers stacked face-to-face in order to obtain a battery with a stacked multilayer structure.

In a specific embodiment, it is advantageous, preferably after stacking and before terminals are added, to encapsulate the stack by depositing a ceramic or a glass-ceramic layer so as to ensure protection of the battery cell from the atmosphere. These encapsulation layers must be chemically stable, resist high temperatures and be impermeable to the atmosphere (barrier layers). These layers may advantageously be deposited by chemical vapor deposition (CVD), which makes it possible to have a covering of all of the accessible stack surfaces. Thus, the encapsulation can be performed directly on the stacks, with the coating being capable of penetrating all of the available cavities. Advantageously, a second encapsulation layer may be deposited on the first encapsulation layer in order to increase the protection of the battery cells from their external environment. Typically, the deposition of this second layer may be performed by silicone impregnation. The choice of such a material is made because it is resistant to high temperatures and the battery can thus easily be assembled by soldering on electronic cards, without the appearance of glass transitions.

Advantageously, the encapsulation of the battery is performed on four of the six faces of the stack. The encapsulation layers surround the periphery of the stack, with the remainder of the protection from the atmosphere being ensured by the layers obtained by the terminals.

Once the stack has been produced, and after the step of encapsulating the stack if this step is performed, terminals (electrical contacts) 35, 36 are added where the cathode, and anode, current collectors are exposed (not covered with insulating electrolyte). These contact areas may be on the opposite sides of the stack in order to collect the current, as shown in FIG. 3, but also on the same sides and on adjacent sides.

To produce the terminals 35, 36, the stack, optionally coated, is cut according to cutting planes making it possible to obtain unitary battery components, with exposure on each of the cutting planes of the connections (+) and (−) of the battery. The connections can then be metallized by means of plasma deposition techniques known to a person skilled in the art. The terminals 35, 36 preferably consist of an external tin layer in order to promote the solderability of the battery, and a nickel layer below the tin layer in order to thermally protect the battery cell.

Thus, the method according to the invention makes it possible to produce all-solid three-dimensional batteries, consisting of a plurality of elementary cells, all of the latter being connected with one another in parallel.

The production method according to the invention has the following numerous advantages. It makes it possible to produce compact all-solid batteries without using high temperatures. The low temperatures used limit the risks of interdiffusion or solid-state reactions at the interfaces. The method makes it possible to produce all-solid batteries without the risk of cracks associated with shrinkage of the electrodes and electrolyte layers during the assembly step. The method according to the invention makes it possible to produce all-solid compact batteries by assembly of elementary cells. In fact, the method according to the invention makes it possible to produce three-dimensional assemblies of all-solid battery cells. This one-step assembly of all of the cells makes it possible to produce an all-solid one-piece battery consisting of a plurality of elementary cells all connected with one another in parallel. The elementary cells are not independent of one another.

The method according to the invention also makes it possible to do without rigid substrates, as the rigidity is conferred by the stacking and all-solid assembly of the structure. In addition, this production technology makes it possible to work directly on very thin metallized films, making it possible to obtain battery cells with very high power and energy densities.

Moreover, this technology makes it possible to produce entirely secure batteries, without the risk of an internal short-circuit and characterized by low self-discharges.

Finally, the batteries obtained according to the method are characterized by high power and energy densities and can operate under extreme temperature conditions without their physical and chemical properties being altered.

EXAMPLES

The invention is illustrated above by two examples (examples 1 and 2), which, however, do not limit the invention in any way. Example 1 describes a method for obtaining a battery including a multilayer cell in which the substrates, which act as anode or cathode current collectors, are made of aluminum. Example 2 describes a method for obtaining a battery having a multilayer cell in which the substrates, which act as anode or cathode current collectors, are made of copper; which method also includes a step of encapsulating the multilayer cell.

Example 1

(a) Preparation of the Substrate

An aluminum strip with a thickness of 15 μm is provided. The strip is placed in an unwinder and positioned on a holding frame, so as to create a rigid structure for holding the aluminum strip without creasing it. This holding frame has an outer insulating surface; however, its inner conductive surfaces are in electrical contact with the aluminum strip and make it possible to impose a potential thereon.

(b) Producing a Colloidal Suspension of Li4Ti5O12 Nanoparticles/Deposition of the Anode Layer/Deposition of an Electrolyte Layer on the Anode Layer To produce an anode electrode on the previously prepared aluminum substrate, a colloidal suspension is produced in the ethanol of nanoparticles having the following chemical composition: 2 g/l of Li4Ti5O12, 0.02 g/l of carbon black powder, 0.3 g/l of Li1.3Al0.3Ti1.7(PO4)3 and several ppm of citric acid. The sizes of the particles in this colloidal suspension are between 20 and 70 nm. From this colloidal suspension, a deposition by electrophoresis of nanoparticles contained in said suspension is performed on the aluminum substrate. The anode layer deposit is produced under a voltage of 80V. Once dried in the oven, this deposit was consolidated with a thermal treatment at 400° C. under 40 MPa of uniaxial pressure.

Once the anode electrode has been produced, an electrolyte layer is deposited at the surface by electrophoresis from a suspension of Li1.3Al0.3Ti1.7(PO4)3. It is a suspension of particles of Li1.3Al0.3T1.7(PO4)3 at 10 g/l in ethanol. The particle size is 30 nm and the deposition conditions are 10V for 30 seconds, which makes it possible to obtain a film having a thickness of around 0.5 μm. The electrolyte layer is then dried and pressed under 50 MPa.

(c) Production of a Colloidal Suspension of Nanoparticles of LiMn1.5Ni0.4Cr0.1O4/Deposition of the Cathode Layer/Deposition of an Electrolyte Layer on the Anode Layer On a second strip, a positive electrode is produced by electrophoretic deposition of a suspension of nanoparticles of LiMn1.5Ni0.4Cr0.1O4. The suspension of LiMn1.5Ni0.4Cr0.1O4 in acetone was performed with a concentration equal to 5 g/l of nanoparticles of LiMn1.5Ni0.4Cr0.1O4 with several ppm of an acetylacetone-type stabilizer. The deposition conditions used are 100 V for 30 seconds in order to obtain a cathode layer. After drying, the layer was consolidated by a uniaxial compression treatment under heat at 300° C. and 50 MPa.

Once the cathode electrode has been produced, an electrolyte layer is deposited on its surface by electrophoresis of a suspension of Li1.3Al0.3Ti1.7(PO4)3. It is a suspension of Li1.3Al0.3Ti1.7(PO4)3 at 10 g/l in ethanol. The particle size is 30 nm and the deposition conditions are 10 V for 30 seconds, which enables a film having a thickness of around 0.5 μm of thickness. This electrolyte film is then dried and pressed under 50 MPa.

(d) Deposition of an Ms Bonding Material Layer

In order to facilitate the production of the assembly of two half-electrodes at two solid electrolyte surfaces, nanoparticles of Li3PO4 are first deposited on each of said surfaces. This deposition is performed by immersing the electrolyte-coated electrodes in a suspension of nanoparticles of Li3PO4 in ethanol. The particle size is around 15 nm. The electrodes coated with solid electrolyte films are dipped in the colloidal suspension of Li3PO4 and removed at a speed of 100 mm/min. The deposited thickness is then 50 nm.

(e) Assembly of Half-Electrodes

The assembly between the two half-electrodes was performed by an annealing treatment under 80 MPa, with a rate of temperature increase from 100° C./min to 350° C., followed by maintaining said temperature for five minutes before cooling the assembly. Finally, the two half-electrodes are assembled face-to-face by a thermal treatment under pressure.

Example 2

Preparation of the Substrate

A copper strip having a thickness of 5 μm, in which the smooth surfaces have previously been made smooth by electropolishing, coated with a thin film of 100 nm of chromium (Cr) produced by metallization. The substrate is then placed in an unwinder and positioned on a holding frame, so as to create a rigid structure for holding the strip without creasing it. This holding frame has an outer insulating surface; however, its inner conductive surfaces are in electrical contact with the chromium-coated copper strip and make it possible impose a potential thereon.

(b) Production of a Colloidal Suspension of Nanoparticles of Li4Ti5O12/Deposition of the Anode Layer/Deposition of an Electrolyte Layer on the Anode Layer In order to produce an anode electrode on the previously prepared substrate, a colloidal suspension of nanoparticles having the following chemical composition is produced in ethanol: 10 g/l of Li4Ti5O12 nanopowder with several ppm (<10 ppm) of citric acid.

The sizes of particles in this suspension are between 20 and 70 nm. From this colloidal suspension, a deposition by electrophoresis of the nanoparticles contained in said suspension is produced on the substrate. The anode layer deposit was produced at a voltage of 90 V/cm. The deposit was dried and consolidated at 450° C. for 10 minutes.

Once the anode has been produced, a solid electrolyte layer is deposited on the surface by electrophoresis from a colloidal suspension of nanoparticles of Li3.6Si0.6P0.4O4. This suspension was produced in ethanol, with a dry extract of 10 g/l and particle sizes on the order of 30 nm. This film was deposited under 30 V for 10 seconds. The electrolyte film was dried and consolidated by a thermal treatment at 300° C. for 10 minutes.

(c) Production of a Colloidal Suspension of Nanoparticles of LiMn1.5Ni0.5O4

On a second strip, a positive electrode was produced by electrophoretic deposition of a suspension of nanoparticles of LiMn1.5Ni0.5O4. The colloidal suspension was produced in a 5:1 solvent mixture (butanone: ethanol) with several ppm of acetyl-acetone (<10 ppm) as a stabilizer and a dry extract of 10 g/l. The deposition conditions used were 150 V/cm for several seconds in order to obtain a cathode layer, which was then dried and consolidated by a thermal treatment at 450° C. for 10 minutes.

(d) Deposition of an Ms Bonding Material Layer

To facilitate the production of the assembly of the two half-electrodes at the two solid electrolyte surfaces, nanoparticles of Li3.6Si0.6P0.4O4 were first deposited on the cathode. This deposition was performed by immersing the cathode in a suspension of nanoparticles of Li3.6Si0.6P0.4O4 in ethanol. The particle sizes are on the order of 20 nm. The cathode was dipped in the colloidal suspension of Li3.6Si0.6P0.4O4 and removed at a speed of 100 mm/min. The thickness deposited is on the order of 50 nm.

(e) Assembly of Half-Electrodes in Order to Produce Multilayer Cells

Before being stacked, the anodes coated with the solid electrolyte film and the cathodes were "punched" in order to produce cutouts with the dimensions of the battery to be produced. These patterns (cf. FIGS. 8 and 9, references B) include the three cutouts that adjoin one another and that define the dimension of the battery. A second slot (cf. FIGS. 8 and 9, reference A) was produced on the non-cut side so as to be capable of ensuring the passage of the products necessary for encapsulation of the component.

The deposition of Ms bonding material could be produced after or before this electrode punching step. The anode and cathode electrodes were then stacked alternately so as to form a stack of a plurality of elementary cells. The anode and cathode cutout patterns were placed in a "head-to-tail" configuration as shown in FIG. 9. This stack was then pressed at 50 MPa and heated at 350° C. for 10 minutes in order to obtain a one-piece and rigid multilayer stacked structure.

This assembly of stacked sheets was then placed in a deposition chamber under vacuum in order to produce a deposit conforming to a protective encapsulation material that will cover the entirety of the surfaces of said stack, including inside the cutout areas. The orifices A (cf. FIGS. 8 and 9) promote the penetration of the material deposited on the inner faces of the stacked layers. This protective material may be a hexamethyldisiloxane (HMDSO) coating deposited by plasma-enhanced chemical vapor deposition. This first coating layer enables the battery cell to be protected from the external environment and more specifically from moisture. A second layer of 15 μm of silicone is then applied by injection in order to coat the battery cells with a layer that will protect the batteries from mechanical damage.

This assembly of battery elements, stacked and coated, is then cut out according to cutting planes making it possible to obtain unity battery components, with exposure on each of the cutting planes of the connections (+) and (−) of the batteries, on opposite faces. These connections are then metallized by means of plasma deposition techniques in order to obtain the battery component shown in FIG. 10. The terminals consist of a nickel layer thermally protecting the battery cell and a tin layer facilitating the solderability of the battery obtained.

FIG. 10 shows a multilayer battery capable of being obtained by the method according to the invention, according to a particular embodiment. More specifically, the multilayer battery includes: a plurality of substrate layers 20 made of a metal sheet, or a metal sheet covered with a noble metal, or a polymer sheet metalized with a noble metal, or a graphite sheet covered with a noble metal; a plurality of solid electrolyte layers 22; a plurality of thin anode layers 21; a plurality of thin cathode layers 24; a plurality of Ms bonding material layers (not shown in the Figure); at least one thin encapsulation layer 37 that may consist of a polymer, a ceramic or glass-ceramic material, which may, for example, be in the form of an oxide, nitride, phosphates, oxynitride or siloxane. Advantageously, this encapsulation layer includes a ceramic or glass-ceramic layer covered with an epoxy or silicone resin; terminals 35, 36, which make it possible to use alternately positive and negative electrical connections on each of the ends. These terminals make it possible to produce electrical connections in parallel between the different battery elements. For this, only the connections (+) leave at one end, and the (−) are available at the other ends. Preferably, the connections (+) and (−) are laterally offset and the encapsulation serves as a dielectric substance for preventing the presence of a short-circuit on said ends. The terminals 35, 36 are shown here as a double layer but may be produced as a single layer.

What is claimed is:

1. A method for producing an all-solid multilayer battery, the method comprising:
depositing, by electrophoresis without any binder, at least one anode layer containing anode materials, at least one electrolyte layer containing solid electrolyte materials, and at least one cathode layer containing cathode materials, wherein the at least one anode layer, the at least one electrolyte layer, and the at least one cathode layer are each obtained from a colloidal suspension containing nanoparticles that are not agglomerated with each other to create clusters and remain isolated from each other, and the diameter of the nanoparticles is less than 50 nm;
depositing a layer of Ms bonding material on a surface of the at least one electrolyte layer, and which will be stacked face-to-face, the deposition of the Ms bonding material including conducting a technique selected from the group consisting of: sol-gel deposition technique, suspended nanoparticle deposition technique, inking, dipping, centrifugation, Langmuir-Blodgett techniques, electrospraying technique, aerosol deposition technique, electrophoresis deposition technique; and then
stacking, after the deposition by electrophoresis, two layers from the at least one anode layer without porosity, the at least one electrolyte layer without porosity, and the at least one cathode layer without porosity, face-to-face to obtain the all-solid multilayer battery having an assembly of a plurality of elementary cells connected with one another in parallel.

2. The method of claim 1, further comprising the following successive steps:
(a) depositing the anode layer and the cathode layer on respective conductive substrates or conductive elements thereof, to thereby serve as an anode and cathode current collector, respectively;

(b) depositing the solid electrolyte layer on at least one of the layers obtained in step (a);

(c) depositing the Ms bonding material layer on at least one of the layers obtained in step (a) and/or step (b); and (d) stacking the layer obtained in step (c) face-to-face with the layer obtained in step (a), (b) or (c) in order to obtain a stack, and performing a thermal treatment and/or mechanical compression promoting contact between said layers stacked face-to-face in order to obtain the all-solid battery.

3. The method of claim 2, wherein when the solid electrolyte layer is deposited on at least one of the two layers obtained in step (a), the thickness of the Ms bonding material layer obtained in step (c) is below one of 100 nm, 50 nm, and 30 nm.

4. The method of claim 2, wherein the mechanical compression of step (d) is performed at a pressure of between 10 MPa and 50 MPa.

5. The method of claim 2, wherein the thermal treatment of step (d) is performed at a temperature $T_R$ that does not exceed one of 0.7 times, 0.5 times, and 0.3 times a melting or decomposition temperature (expressed in ° C.) of at least one most fusible Ms bonding material subjected to said thermal densification step.

6. The method of claim 2, wherein the Ms bonding material includes one or more of the following materials:

oxide-based materials chosen from $Li_{3.6}Ge_{0.6}V_{0.4}O_4$; $Li_2O-Nb_2O_5$; $LiSiO_4$; $Li_2O$; $Li_{14}Zn(GeO_4)_4$; $Li_{0.35}La_{0.55}TiO_3$; $Li_{0.5}La_{0.5}TiO_3$; $Li_7La_3Zr_2O_{12}$; $Li_{5+x}La_3(Zr_xA_{2-x})O_{12}$) with A=Sc, Ti, V, Y, Nb, Hf, Ta, Al, Si, Ga, Ge, Sn and $1.4 \le x \le 2$;

nitride- or oxynitride-based materials selected from the group consisting of: $Li_3N$; $Li_3PO_{4-x}N_{2x/3}$, $Li_4SiO_{4-x}N_{2x/3}$, $Li_4GeO_{4-x}N_{2x/3}$ with $0<x$ 4 or $Li_3BO_{3-x}N_{2x/3}$ with $0<x<3$; lithium and phosphorus oxynitride-based materials that may contain silicon, boron, sulfur or aluminum or a combination of aluminum, boron, sulfur and/or silicon; the lithium and boron oxynitride-based materials that may contain silicon, sulfur or aluminum or a combination of aluminum, sulfur and silicon; and $Li_xPO_yN_z$ material, with x~2.8 and 2y=3z with $0.16 \le z \le 0.46$; or $Li_wPO_xN_yS_z$ with $(2x+3y+2z)=(5+w)$ and $3.2 \le x \le 3.8$; $0.13 \le y \le 0.4$; $0 \le z \le 0.2$; $2.9 \le w \le 3.3$; or $Li_tP_xAl_yO_uN_vS_w$ with $(5x+3y)=5$; $(2u+3v+2w)=(5+t)$; $2.9 \le t$ 3.3; $0.84 \le x \le 0.94$; $0.094 \le y \le 0.26$; $3.2 \le u \le 3.8$; $0.13 \le v \le 0.46$; $0 \le w \le 0.2$; or $Li_{1.9}Si_{0.2}P_{1.0}O_{1.1}N_{1.0}$; or $Li_{2.9}PO_{3.3}N_{0.46}$;

sulfide-based materials selected from the group consisting of: $Li_xM_{1-y}M'_yS_4$ with M=Si, Ge, Sn and M'=P, Al, Zn, Ga, Sb; $Li_2S$; $B_2S_3$; $P_2S_5$; $70Li_2S-30P_2S_5$; $Li_7P_3S_{11}$; $Li_{10}GeP_2S_{12}$; $Li_7PS_6$; $Li_{3.25}Ge_{0.25}P_{0.75}S_4$; $Li_{10}MP_2S_{12}$ with M=Si, Ge, Sn and mixtures between $Li_2S$ and one of $P_2S_5$, $GeS_2$, $Ga_2S_3$, and $SiS_2$;

phosphate or borate-based materials selected from the group consisting of: $Li_3PO_4$; $LiTi(PO_4)_3$; $Li_{1+x}AlN_{2-x}(PO_4)_3$ (or M=Ge, Ti, and/or Hf and in which $0<x$ 1); $Li_{1.3}Al_{0.3}Ti_{1.7}(PO_4)_3$; $Li_{1+x+y}Al_xTi_{2-x}Si_yP_{3-y}O_{12}$ (in which $0 \le x \le 1$ and $0 \le y \le 1$); $Li_{1+x+z}Mx(Ge_{1-y}Ti_y)_{2-x}Si_zP_{3-z}O_{12}$ (in which $0 \le x \le 0.8$, $0 \le y \le 1.0$, $0 \le z \le 0.6$); $2(Li_{1.4}Ti_2Si_{0.4}P_{2.6}O_{12})-AlPO_4$; $Li_xAl_{z-y}Ga_yS_w(PO_4)_c$ or $Li_xAl_{z-y}Ga_yS_w(BO_3)_c$ or $Li_xGe_{z-y}Si_yS_w(PO_4)_c$ or $Li_xGe_{z-y}Si_yS_w$ $(BO_3)_c$ or $Li_xM_{z-y}M'_ySw(PO_4)_c$ or $Li_xM_{z-y}M'_ySw(BO_3)_c$ with $4<w<20$, $3<x<10$, $0 \le y \le 1$, $1 \le z \le 4$ and $0<c<20$ and M or M' is an element among Al, Si, Ge, Ga, P, Zn, and Sb; and mixed materials chosen from mixtures between $Li_2S$ and one of $Li_3PO_4$, $Li_3PO_{4-x}N_{2x/3}$, $Li_4SiO_{4-x}N_{2x/3}$, $Li_4GeO_{4-x}N_{2x/3}$ with $0<x<4$ or $Li_3BO_{3-x}N_{2x/3}$ with $0<x<3$ one of $Li_2S$ and/or $B_2S_3SiS_2$, $P_2S_5$, $GeS_2$, and $Ga_2S_3$, and an $Li_dMO_b$ compound.

7. The method of claim 2, wherein the Ms bonding material comprises at least one polymer impregnated with a lithium salt, the polymer being selected from the group consisting of: polyethylene oxide, polyimides, vinylidene polyfluoride, polyacrylonitrile, polymethyl methacrylate, polysiloxanes, and lithium salt that includes one of LiCl, LiBr, LiI, $LiClO_4$, $LiBF_4$, $Li(PF_6)$ $LiPF_6$, $LiAsF_6$, $LiCH_3CO_2$, $LiCF_3SO_3$, $Li(CF_3SO_2)_2N$, $Li(CF_3SO_2)_3$, $LiCF_3CO_2$, $Li(B(C_6H_5)_4)$, $Li(SCN)$ LiSCN, and $LiNO_3$.

8. The method of claim 2, further comprising a step of encapsulating the all-solid battery by depositing at least one encapsulation layer.

9. An all-solid, multi-layer battery, comprising:

a stacked multi-layer that includes:

at least one anode layer without porosity deposited on a conductive substrate or conductive elements thereof, to thereby serve as an anode current collector, the at least one anode layer not containing any binders;

at least one cathode layer without porosity deposited on a conductive substrate or conductive elements thereof, to thereby serve as a cathode current collector, the at least one cathode layer not containing any binders;

at least one electrolyte layer without porosity deposited on at least one of the at least one anode layer and the at least one cathode layer, the at least one electrolyte layer not containing any binders; and a layer of Ms bonding material deposited on a surface of at least one of the at least one anode layer, the at least one electrolyte layer, and the at least one cathode layer using a technique selected from the group consisting of: sol-gel deposition technique, suspended nanoparticle deposition technique, inking, dipping, centrifugation, Langmuir-Blodgett techniques, electrospraying technique, aerosol deposition technique, and an electrophoresis deposition technique, wherein each of the at least one anode layer, the at least one electrolyte layer, and the at least one cathode layer are obtained by an electrophoresis process, and wherein two layers from the at least one anode layer, the at least one electrolyte layer, and the at least one cathode layer are in a stacked formation that includes an assembly of a plurality of elementary cells connected with one another in parallel.

10. The all-solid, multi-layer battery of claim 9, wherein the conductive substrates of the at least one anode layer and the at least one cathode layer respectively comprises:

metal sheets coated with a noble metal; or polymer sheets coated with a noble metal; or graphite sheets coated with a noble metal.

11. The all-solid, multi-layer battery of claim 10, wherein the metal sheets are made of aluminum or copper.

12. The all-solid, multi-layer battery of claim 10, wherein the conductive substrates of the at least one anode layer and the at least one cathode layer respectively comprises polymer sheets coated with a noble metal, the polymer sheets being selected from the group consisting of: polyethylene naphthalate, polyethylene terephthalate, polypropylene (PP), polytetrafluoroethylene, or polyimide.

13. The all-solid, multi-layer battery of claim 9, wherein the conductive substrates of the at least one anode layer and the at least one cathode layer respectively comprises a metal selected from the group consisting of: gold, platinum, palladium, vanadium, cobalt, nickel, manganese, niobium, tantalum, chromium, molybdenum, titanium, zirconium, tungsten, and any alloy including at least one thereof.

14. The all-solid, multi-layer battery of claim 9, further comprising at least one first encapsulation layer, composed of a ceramic or glass-ceramic.

15. The all-solid, multi-layer battery of claim 14, further comprising a second encapsulation layer composed of silicone polymer deposited on the first encapsulation layer.

16. The all-solid, multi-layer battery of claim 14, wherein the at least one first encapsulation layer covers four of six faces of the all-solid battery.

17. The all-solid, multi-layer battery of claim 9, further comprising terminals at exposed areas of the at least one anode layer and the at least one cathode layer, respectively.

18. The all-solid, multi-layer battery of claim 17, wherein the terminals are located on opposite sides of the stack.

19. The all-solid, multi-layer battery of claim 17, wherein the terminals are covered with a nickel layer in contact with electrochemical cells, the nickel layer being covered with a tin layer.

* * * * *